United States Patent
Carasso

(10) Patent No.: US 10,592,694 B2
(45) Date of Patent: *Mar. 17, 2020

(54) ANONYMIZING MACHINE DATA EVENTS

(71) Applicant: Splunk Inc., San Francisco, CA (US)

(72) Inventor: David Carasso

(73) Assignee: Splunk Inc., San Francisco, CA (US)

( * ) Notice: Subject to any disclaimer, the term of this patent is extended or adjusted under 35 U.S.C. 154(b) by 191 days.

This patent is subject to a terminal disclaimer.

(21) Appl. No.: 15/798,317

(22) Filed: Oct. 30, 2017

(65) Prior Publication Data
US 2018/0046829 A1    Feb. 15, 2018

Related U.S. Application Data

(63) Continuation of application No. 14/611,155, filed on Jan. 30, 2015, now Pat. No. 9,836,623.

(51) Int. Cl.
*G06F 21/00* (2013.01)
*G06F 21/62* (2013.01)
*G06F 3/0482* (2013.01)
*G06F 3/0484* (2013.01)
(Continued)

(52) U.S. Cl.
CPC ........ *G06F 21/6254* (2013.01); *G06F 3/0481* (2013.01); *G06F 3/0482* (2013.01);
(Continued)

(58) Field of Classification Search
CPC .. G06F 21/6254; G06F 3/0481; G06F 3/0482; G06F 3/0484; G06F 3/04847;
(Continued)

(56) References Cited

U.S. PATENT DOCUMENTS 7,562,397 B1 * 7/2009 Mithal ............... G06Q 30/0235
                                                          705/52
2007/0002360 A1 * 1/2007 Levien ................... G06F 21/10
                                                          358/1.14
(Continued)

OTHER PUBLICATIONS

GitHub, coccyx and Jaykul, eventgen.conf.spec, pp. 1-6, Dec. 8, 2013, Internet WWW browse https: at //github.com/splunk/eventgen/blob/master/README/eventgen.conf.spec.
(Continued)

*Primary Examiner* — Yogesh Paliwal
(74) *Attorney, Agent, or Firm* — Law Office of Thomas L. Treffert

(57) ABSTRACT

Components of a system for generating anonymized data from timestamped event data are disclosed. The generation of anonymized data is performed in accordance with an anonymization configuration. The anonymization configuration includes information regarding the source of the event data, particulars about the anonymization process that transforms the clear event data from the source into an anonymized form, and particulars about the destination and characteristics for the output dataset. A graphical user interface permits development of anonymization configurations in an interactive, iterative way. The configured anonymizer employs methods and options to produce anonymized data with superior usability as a substitute for real world data, including a mode to effectively emulate live data streams.

30 Claims, 21 Drawing Sheets

(51) Int. Cl.
*G06F 16/23* (2019.01)
*G06F 3/0481* (2013.01)

(52) U.S. Cl.
CPC ........ *G06F 3/0484* (2013.01); *G06F 3/04847* (2013.01); *G06F 16/2322* (2019.01); *G06F 2221/2101* (2013.01)

(58) Field of Classification Search
CPC ......... G06F 17/30353; G06F 17/30477; G06F 2221/2101; G06F 16/2322
See application file for complete search history.

(56) References Cited

U.S. PATENT DOCUMENTS

| | | | |
|---|---|---|---|
| 2007/0136237 A1* | 6/2007 | Barker | G06F 21/6227 |
| 2009/0198746 A1 | 8/2009 | Hintze | |
| 2010/0262836 A1* | 10/2010 | Peukert | G06F 21/6227 |
| | | | 713/189 |
| 2010/0313009 A1* | 12/2010 | Combet | G06Q 30/0204 |
| | | | 713/150 |
| 2014/0063237 A1* | 3/2014 | Stone | H04N 7/181 |
| | | | 348/143 |
| 2015/0150139 A1* | 5/2015 | Pauquet | G06F 21/60 |
| | | | 726/26 |

OTHER PUBLICATIONS

GitHub, coccyx, Tutorial.md, pp. 1-10, Dec. 6, 2012, Internet WWW browse https: at //github.com/splunk/eventgen/blob/master/README/Tutorial.md.

\* cited by examiner

```
Original Search: 501
search "error | stats count BY host

Sent to peers: 502
search "error | prestats count BY host (map)

Executed by search head: 503
Merge prestats results received from peers (reduce)
```

ANONYMIZING MACHINE DATA EVENTS

RELATED APPLICATIONS

This application is a continuation of U.S. patent application Ser. No. 14/611,155, filed Jan. 30, 2015, entitled "Anonymizing Machine Data Events," which is incorporated herein by reference for all valid purposes.

TECHNICAL FIELD

The present disclosure relates to anonymizing data from an input data source.

BACKGROUND

Modern data centers often comprise thousands of hosts that operate collectively to service requests from even larger numbers of remote clients. During operation, components of these data centers can produce significant volumes of machine-generated data. The unstructured nature of much of this data has made it challenging to perform indexing and searching operations because of the difficulty of applying semantic meaning to unstructured data. As the number of hosts and clients associated with a data center continues to grow, processing large volumes of machine-generated data in an intelligent manner and effectively presenting the results of such processing continues to be a priority.

BRIEF DESCRIPTION OF THE DRAWINGS

FIG. 5 illustrates an exemplary search query received from a client and executed by search peers in accordance with the disclosed embodiments.

FIG. 6A illustrates a search screen in accordance with the disclosed embodiments.

FIG. 6B illustrates a data summary dialog that enables a user to select various data sources in accordance with the disclosed embodiments.

DETAILED DESCRIPTION

1. Overview

Figure 1:
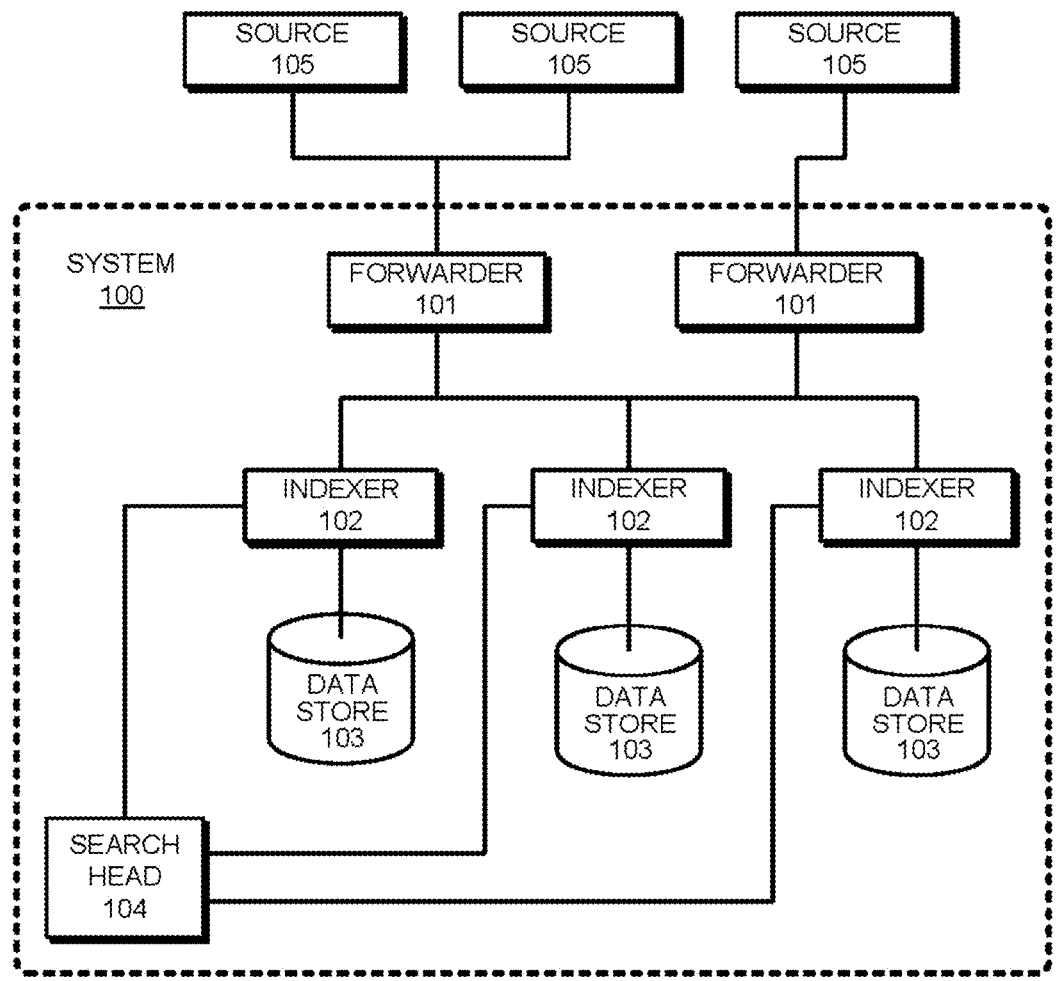
FIG. 1 presents a block diagram of an event-processing system in accordance with the disclosed embodiments.

FIGS. 8 through 21 and the related discussion describe novel systems, storage, and methods for the anonymization of event data as might be useful to provide realistic data for testing, development, distribution, or demonstration, for example, without revealing sensitive information.

FIGS. 1 through 7D and the related discussion describe an event-based system (event processing system) as might be utilized as a source for data to be anonymized. The described event processing system stores and processes performance data generated within an information technology (IT) environment as an example.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "data repository" as used herein, unless the context clearly dictates otherwise, refers to data sources that may contain unstructured or structured data, such as databases, file systems, search engine indexes, or the like. In at least one of the various embodiments, a data repository may be a live stream of data. In other cases, a data repository may be static data, or a combination of live data or static data. In at least one of the various embodiments, data repositories may provide interfaces such as, application programming interfaces (API) for receiving requests, queries regarding the data stored in the data repository.

Fields, i.e. realized fields, in the domain of the event processing system, do not exist within the raw machine data of an event. An event is a timestamped portion of raw machine data. At best, the event data may be said to contain latent field data, more specifically, data that can be used to directly provide or derive fields associated with the event by the application of a late-binding schema or direct use of an extraction rule. Accordingly, any discussion of an event field, field of an event, or the like, will be understood by its context to refer to (i) a field of the event processing system (actual or prospective) associated with the event but not included in it, as such, or (ii) a portion of event data usable to directly provide or derive a field of the event processing system associated with the event by the application of a late-binding schema or extraction rule, or possibly both (i) and (ii).

Embodiments described may include graphical user interfaces, or elements or components, thereof. A graphical user interface (GUI) is the collection of one or more elements that may be displayed/presented to the user and associated processing components that support, direct, control, restrict, enable, or respond to related user input. The various visible elements of a GUI may be all visible in a single display simultaneously, all in a single logical display but not all simultaneously visible to a user (e.g., hidden and unhidden areas of a scrollable window), or visible to the user at various points in time. Accordingly, a GUI is not necessarily a single logical screen image and its associated processing components, but may in some embodiments span multiple spaces (e.g., display areas), multiple times (e.g., successive screen images, or pop-ups), or both. Further, GUI elements need not strictly be single elements but, rather, a GUI element may itself include one or more GUI elements. For example, a dropdown box GUI element may include a value text box GUI element, a dropdown button GUI element, and an available-options display box GUI element.

1. Illustrative Event Data Source
1.1 Overview

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various web sites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a predefined format. This means that unstructured data can comprise various data items having different data types that can reside at different locations. For example, when the data source is an operating system log, an event can include one or more lines from the operating system log containing raw data that includes different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

FIG. 1 presents a block diagram of an exemplary event-processing system 100, similar to the SPLUNK® ENTERPRISE system. System 100 includes one or more forwarders 101 that collect data obtained from a variety of different data sources 105, and one or more indexers 102 that store, process, and/or perform operations on this data, wherein each indexer operates on data contained in a specific data store 103. These forwarders and indexers can comprise separate computer systems in a data center, or may alternatively comprise separate processes executing on various computer systems in a data center.

During operation, the forwarders 101 identify which indexers 102 will receive the collected data and then forward the data to the identified indexers. Forwarders 101 can also perform operations to strip out extraneous data and detect timestamps in the data. The forwarders next determine which indexers 102 will receive each data item and then forward the data items to the determined indexers 102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 100 and the processes described below with respect to FIGS. 1-5 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

Figure 2:
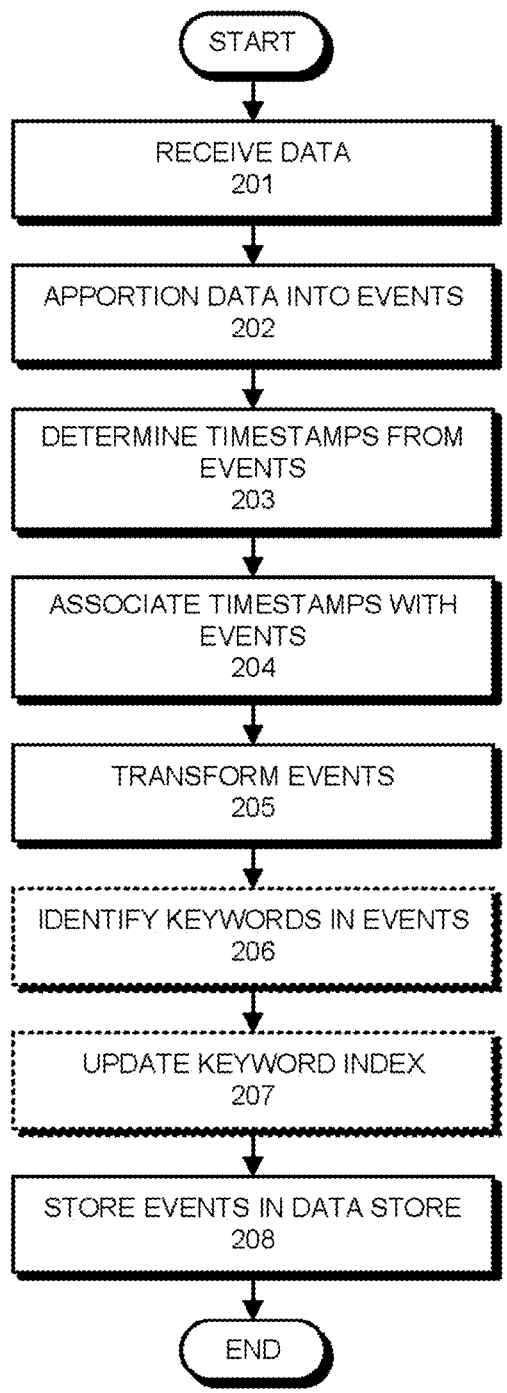
FIG. 2 presents a flowchart illustrating how indexers process, index, and store data received from forwarders in accordance with the disclosed embodiments.

FIG. 2 presents a flowchart illustrating how an indexer processes, indexes, and stores data received from forwarders in accordance with the disclosed embodiments. At block 201, the indexer receives the data from the forwarder. Next, at block 202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 204, for example by storing the timestamp as metadata for each event.

Then, the system can apply transformations to data to be included in events at block 205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 206. Then, at block 207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 102 is responsible for storing and searching a subset of the events contained in a corresponding data store 103. By distributing events among the indexers and data stores, the indexers can analyze events for a query in parallel, for example using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on 30 Apr. 2014, and in U.S. application patent Ser. No. 14/266,817 also filed on 30 Apr. 2014.

1.4 Query Processing

Figure 3:
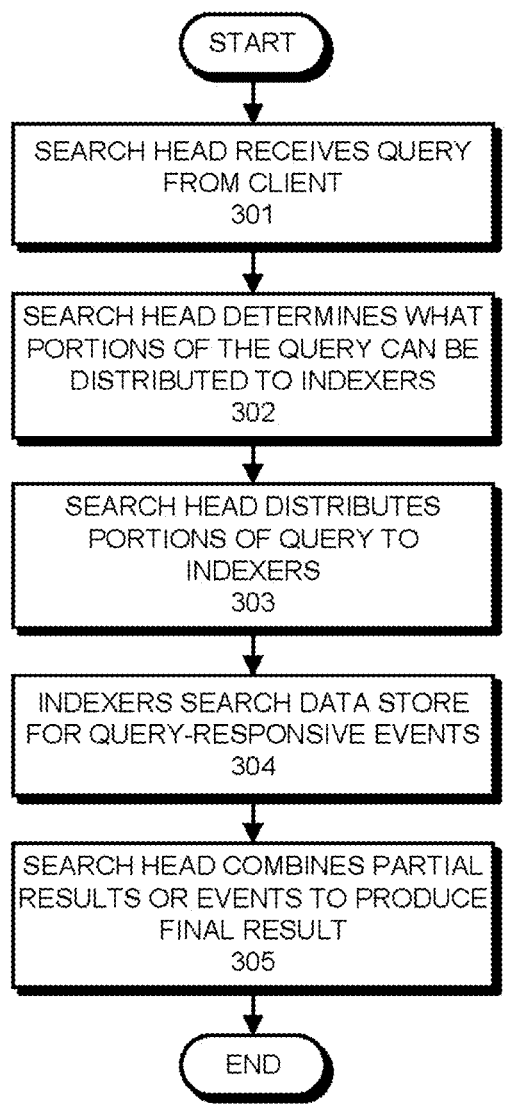
FIG. 3 presents a flowchart illustrating how a search head and indexers perform a search query in accordance with the disclosed embodiments.

FIG. 3 presents a flowchart illustrating how a search head and indexers perform a search query in accordance with the disclosed embodiments. At the start of this process, a search head receives a search query from a client at block 301. Next, at block 302, the search head analyzes the search query to determine what portions can be delegated to indexers and what portions need to be executed locally by the search head. At block 303, the search head distributes the determined portions of the query to the indexers. Note that commands that operate on single events can be trivially delegated to the indexers, while commands that involve events from multiple indexers are harder to delegate.

Then, at block 304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 304 may involve using the late-binding scheme to extract values for specified fields from events at the time the query is processed. Next, the indexers can either send the relevant events back to the search head, or use the events to calculate a partial result, and send the partial result back to the search head.

Finally, at block 305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

1.5 Field Extraction

Figure 4:
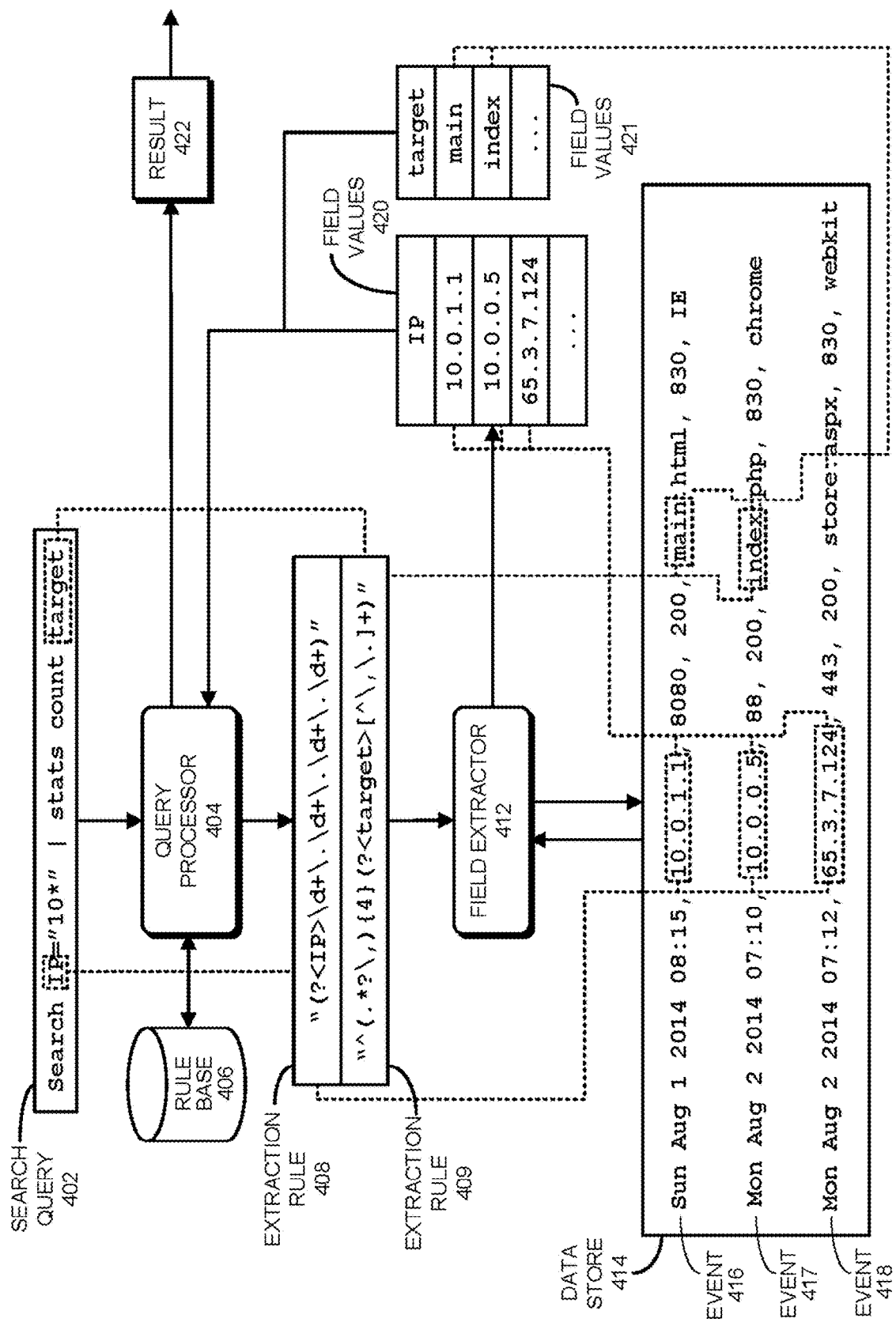
FIG. 4 presents a block diagram of a system for processing search requests that uses extraction rules for field values in accordance with the disclosed embodiments.

FIG. 4 presents a block diagram illustrating how fields can be extracted during query processing in accordance with the disclosed embodiments. At the start of this process, a search query 402 is received at a query processor 404. Query processor 404 includes various mechanisms for processing a query, wherein these mechanisms can reside in a search head 104 and/or an indexer 102. Note that the exemplary search query 402 illustrated in FIG. 4 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 402 can also be expressed in other query languages, such as the Structured Query Language ("SQL") or any suitable query language.

Upon receiving search query 402, query processor 404 sees that search query 402 includes two fields "IP" and "target." Query processor 404 also determines that the values for the "IP" and "target" fields have not already been extracted from events in data store 414, and consequently determines that query processor 404 needs to use extraction rules to extract values for the fields. Hence, query processor 404 performs a lookup for the extraction rules in a rule base 406, wherein rule base 406 maps field names to corresponding extraction rules and obtains extraction rules 408-409, wherein extraction rule 408 specifies how to extract a value for the "IP" field from an event, and extraction rule 409 specifies how to extract a value for the "target" field from an event. As is illustrated in FIG. 4, extraction rules 408-409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 404 sends extraction rules 408-409 to a field extractor 412, which applies extraction rules 408-409 to events 416-418 in a data store 414. Note that data store 414 can include one or more data stores, and extraction rules 408-409 can be applied to large numbers of events in data store 414, and are not meant to be limited to the three events 416-418 illustrated in FIG. 4. Moreover, the query processor 404 can instruct field extractor 412 to apply the extraction rules to all the events in a data store 414, or to a subset of the events that have been filtered based on some criteria.

Next, field extractor 412 applies extraction rule 408 for the first command "Search IP="10*"" to events in data store 414 including events 416-418. Extraction rule 408 is used to extract values for the IP address field from events in data store 414 by looking for a pattern of one or more digits, followed by a period, followed again by one or more digits, followed by another period, followed again by one or more digits, followed by another period, and followed again by one or more digits. Next, field extractor 412 returns field values 420 to query processor 404, which uses the criterion IP="10*" to look for IP addresses that start with "10". Note that events 416 and 417 match this criterion, but event 418 does not, so the result set for the first command is events 416-417.

Query processor 404 then sends events 416-417 to the next command "stats count target." To process this command, query processor 404 causes field extractor 412 to apply extraction rule 409 to events 416-417. Extraction rule 409 is used to extract values for the target field for events 416-417 by skipping the first four commas in events 416-417, and then extracting all of the following characters until a comma or period is reached. Next, field extractor 412 returns field values 421 to query processor 404, which executes the command "stats count target" to count the number of unique values contained in the target fields, which in this example produces the value "2" that is returned as a final result 422 for the query.

Note that query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

1.6 Exemplary Search Screen

Figure 6A:
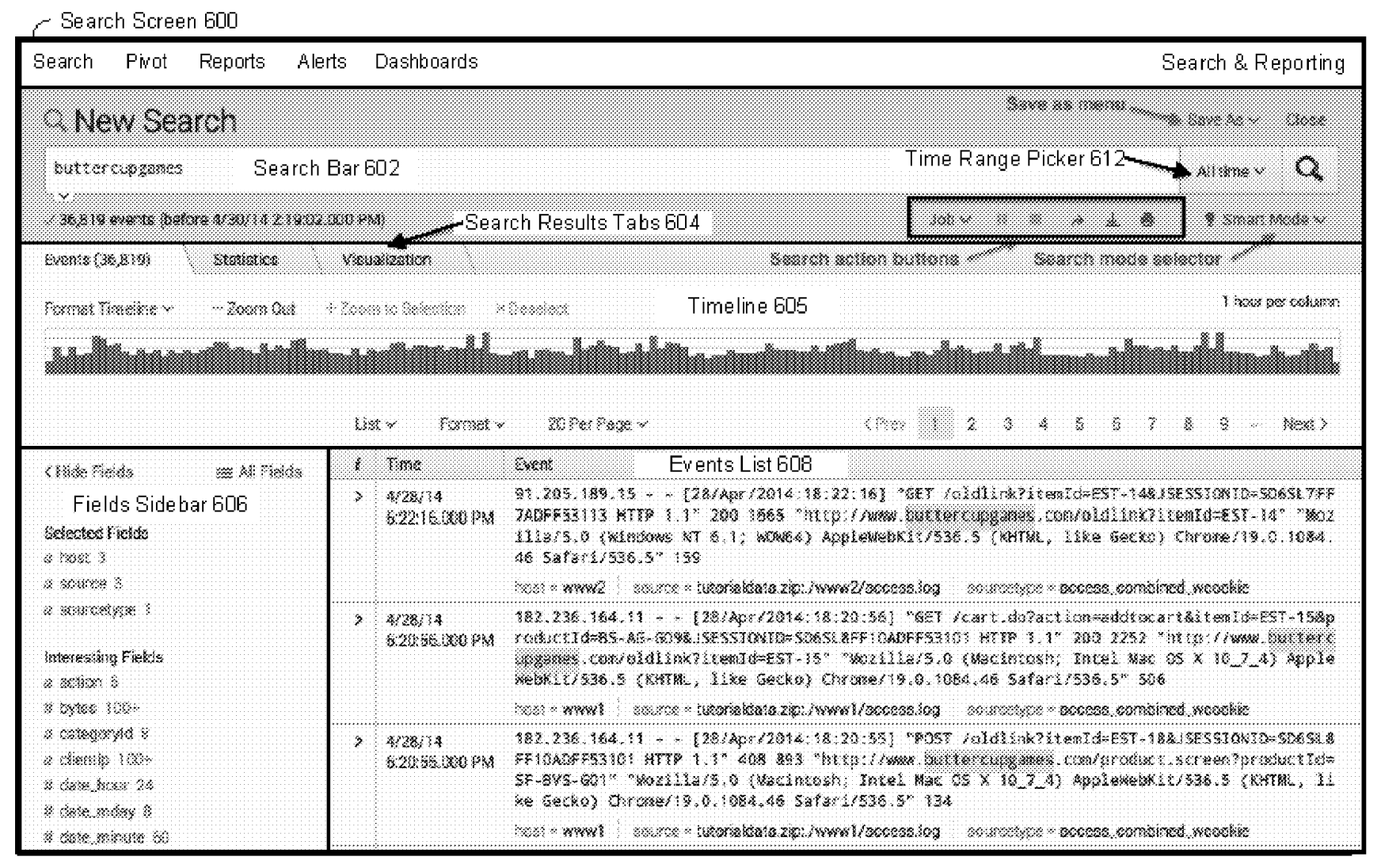
Figure 6B:
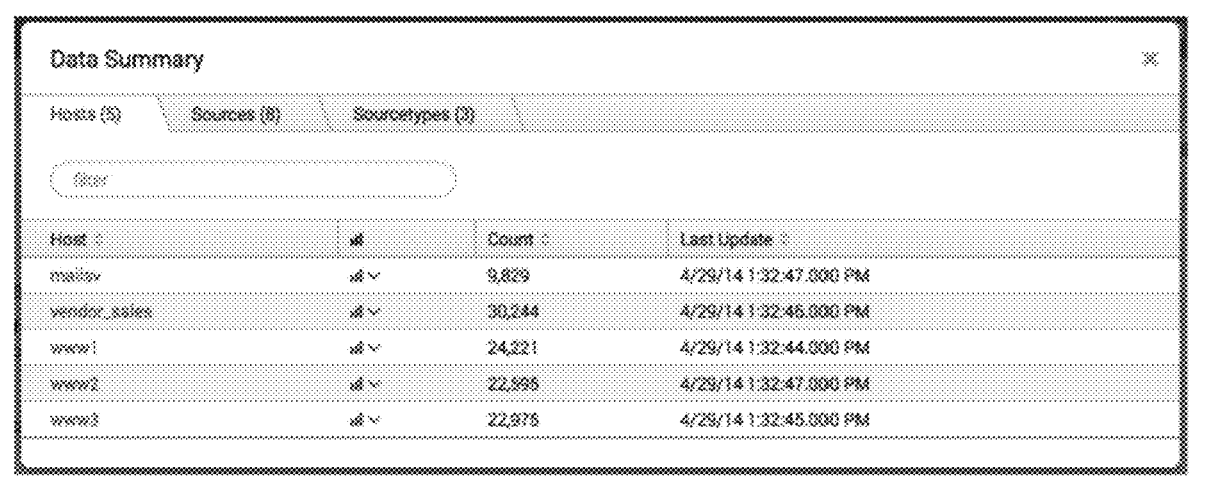

FIG. 6A illustrates an exemplary search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, for example by selecting specific hosts and log files.

After the search is executed, the search screen 600 can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

To facilitate faster query processing, a query can be structured as a map-reduce computation, wherein the "map" operations are delegated to the indexers, while the corresponding "reduce" operations are performed locally at the search head. For example, FIG. 5 illustrates how a search query 501 received from a client at search head 104 can split into two phases, including: (1) a "map phase" comprising subtasks 502 (e.g., data retrieval or simple filtering) that may be performed in parallel and are "mapped" to indexers 102 for execution, and (2) a "reduce phase" comprising a merging operation 503 to be executed by the search head when the results are ultimately collected from the indexers.

During operation, upon receiving search query 501, search head 104 modifies search query 501 by substituting "stats" with "prestats" to produce search query 502, and then distributes search query 502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 3, or may alternatively distribute a modified version (e.g., a more restricted version) of the search query to the search peers. In this example, the indexers are responsible for producing the results and sending them to the search head. After the indexers return the results to the search head, the search head performs the merging operations 503 on the results. Note that by executing the computation in this way, the system effectively distributes the computational operations while minimizing data transfers.

1.7.2 Keyword Index

As described above with reference to the flow charts in FIGS. 2 and 3, event-processing system 100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of system 100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011.

1.8 Security Features

The SPLUNK® ENTERPRISE platform provides various schemas, dashboards and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. patent application Ser. Nos. 13/956,252, and 13/956,262.) Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 7A:
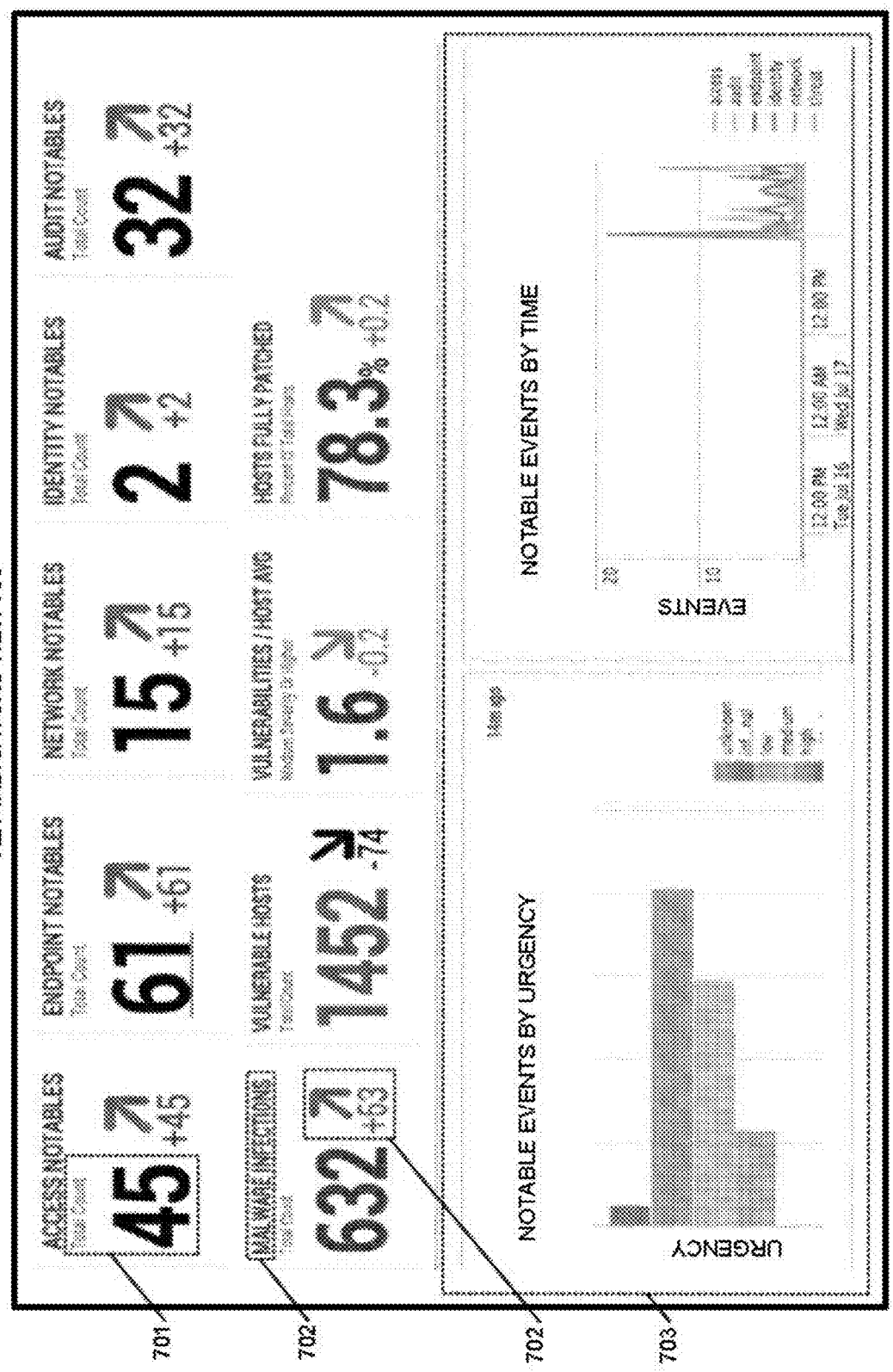
FIG. 7A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 7A illustrates an exemplary key indicators view 700 that comprises a dashboard, which can display a value 701, for various security-related metrics, such as malware infections 702. It can also display a change in a metric value 703, which indicates that the number of malware infections increased by 63 during the preceding interval. Key indicators view 700 additionally displays a histogram panel 704 that displays a histogram of notable events organized by urgency values, and a histogram of notable events organized by time intervals. This key indicators view is described in further detail in pending U.S. patent application Ser. No. 13/956,338 filed Jul. 31, 2013.

Figure 7B:
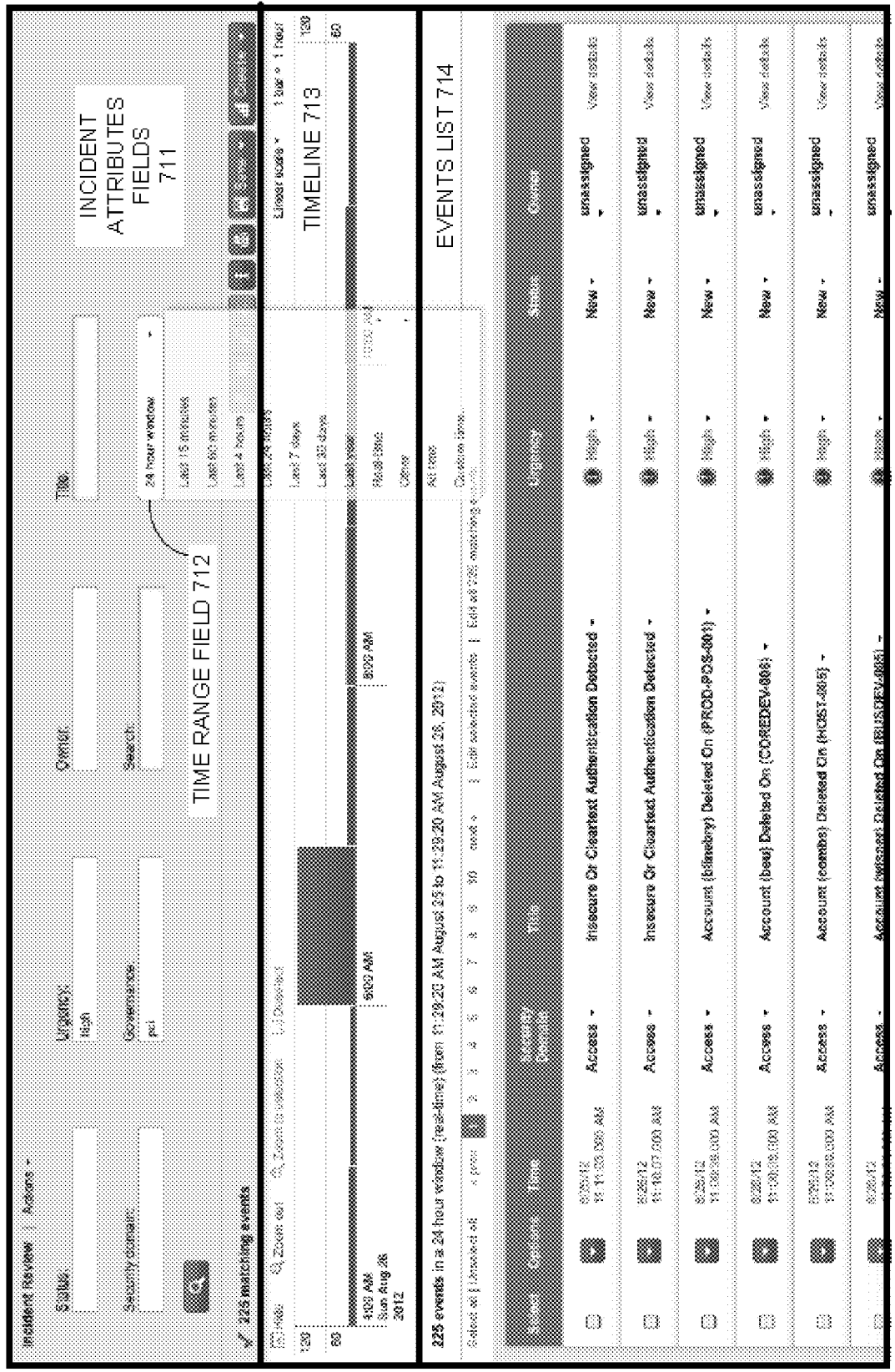
FIG. 7B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 7B illustrates an exemplary incident review dashboard 710 that includes a set of incident attribute fields 711 that, for example, enables a user to specify a time range field 712 for the displayed events. It also includes a timeline 713 that graphically illustrates the number of incidents that occurred in one-hour time intervals over the selected time range. It additionally displays an events list 714 that enables a user to view a list of all of the notable events that match the criteria in the incident attributes fields 711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/User/IncidentReviewdashboard."

1.9 Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. Ser. No. 14/167,316 filed 29 Jan. 2014, which is hereby incorporated herein by reference. Also, see "vSphere Monitoring and Performance," Update 1, vSphere 5.5, EN-001357-00, via HTTP at pubs.vmware.com/vsphere-55/topic/com.vmware.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 7C:
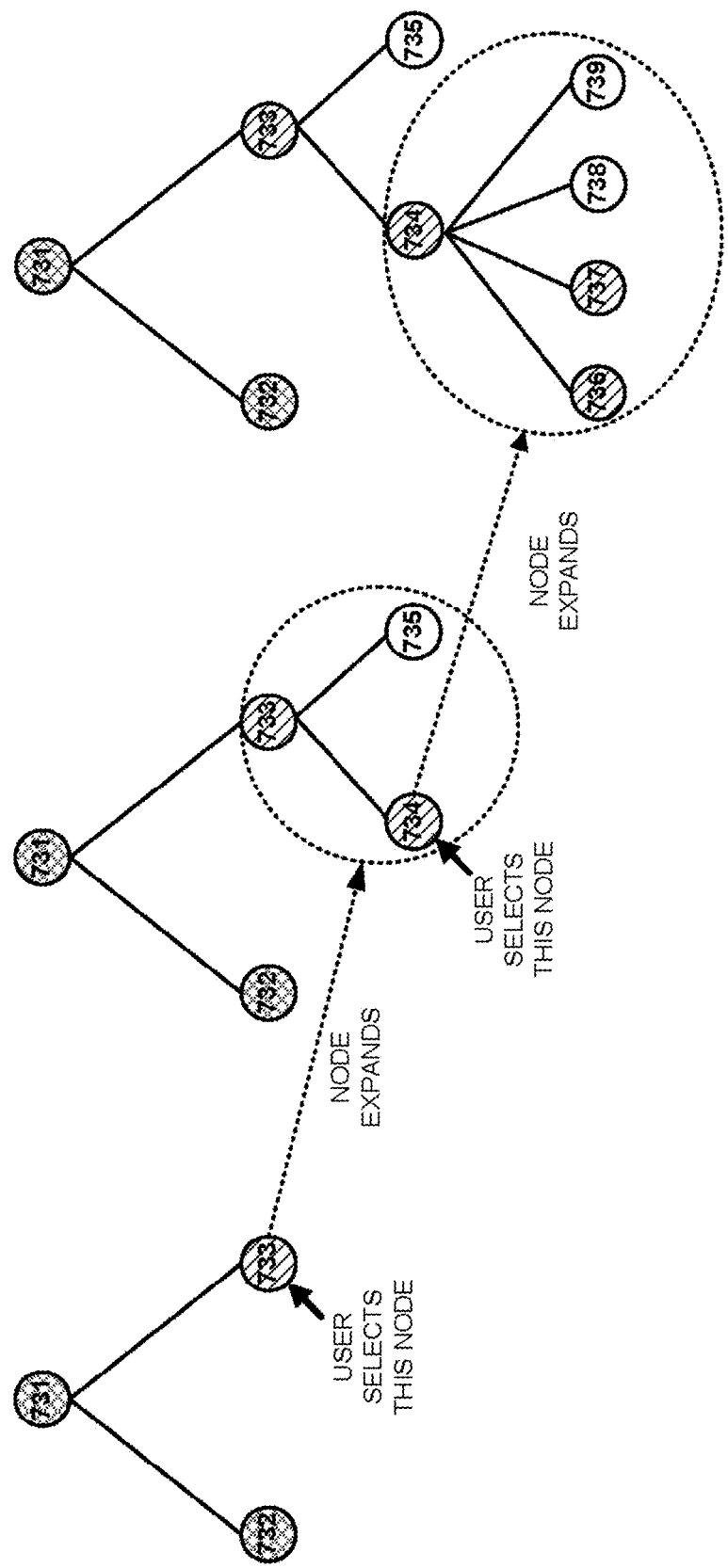
FIG. 7C illustrates a proactive monitoring tree in accordance with the disclosed embodiments.
Figure 7D:
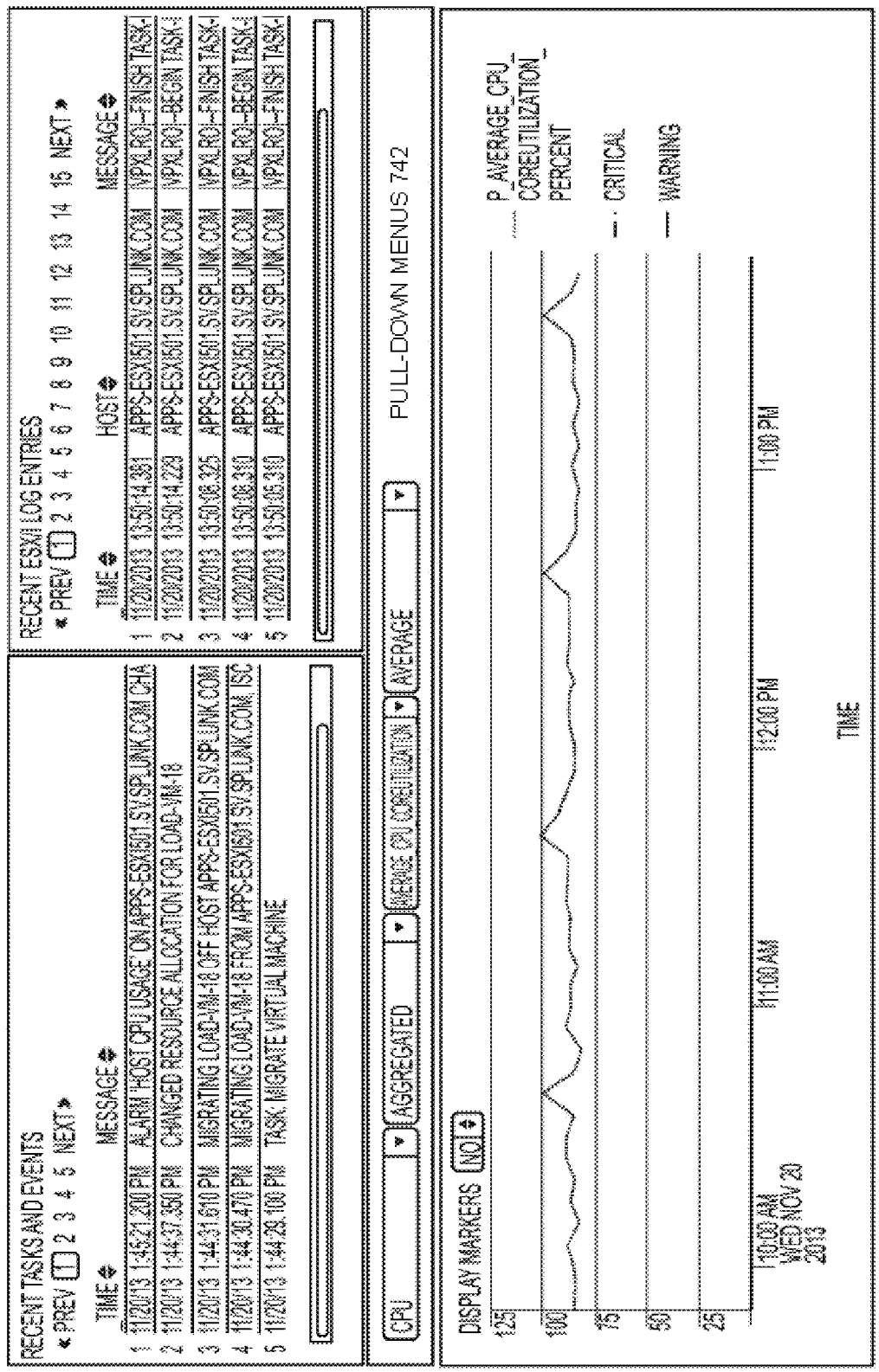
FIG. 7D illustrates a screen displaying both log data and performance data in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 7C, wherein nodes 733 and 734 are selectively expanded. Note that nodes 731-739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on 15 Apr. 2014, which is hereby incorporated herein by reference for all possible purposes.

The SPLUNK® APP FOR VMWARE® also provides a user interface that enables a user to select a specific time range and then view heterogeneous data, comprising events, log data and associated performance metrics, for the selected time range. For example, the screen illustrated in FIG. 7D displays a listing of recent "tasks and events" and a listing of recent "log entries" for a selected time range above a performance-metric graph for "average CPU core utilization" for the selected time range. Note that a user is able to operate pull-down menus 742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference for all possible purposes.

2. Anonymizer 2.2 Anonymizer System

Figure 8:
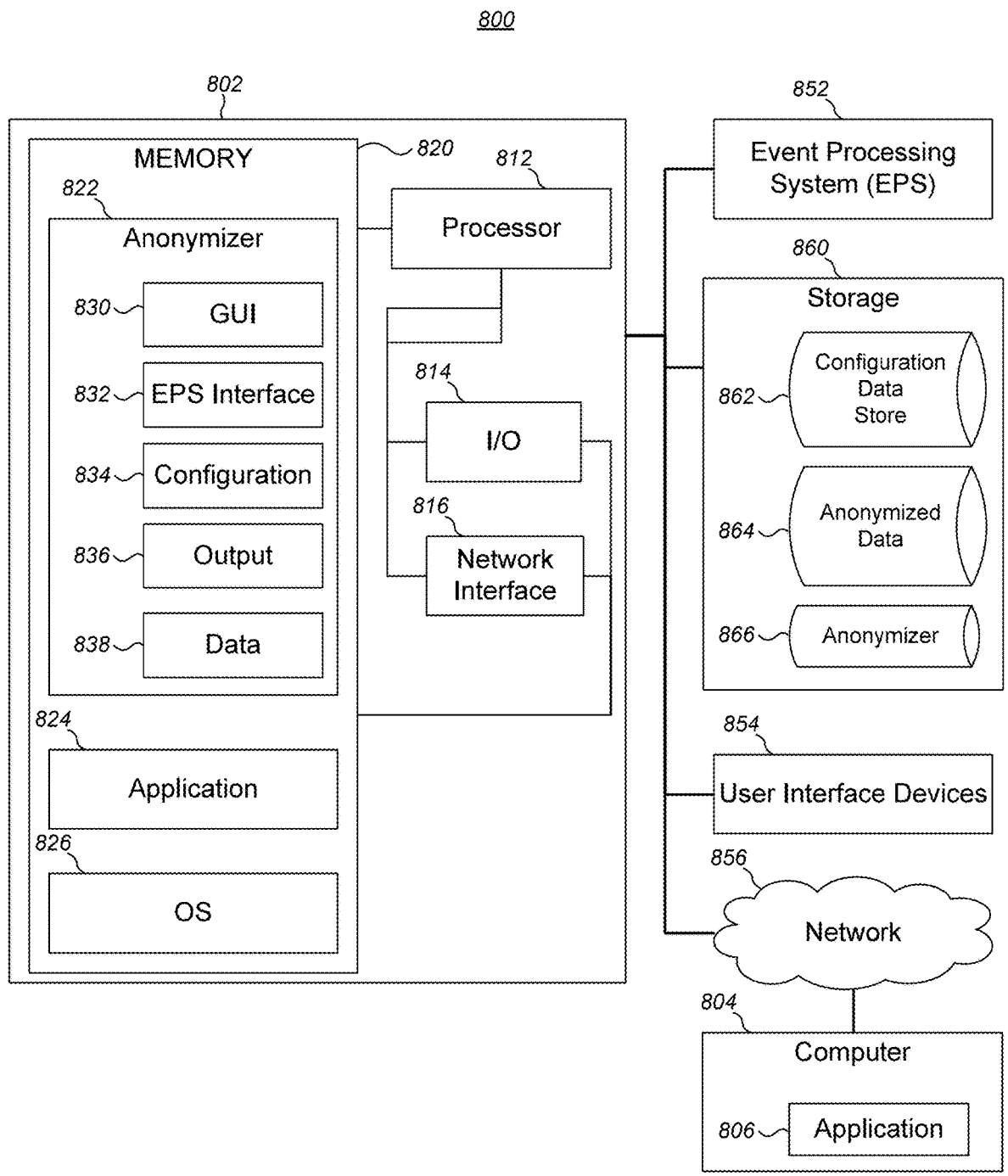
FIG. 8 presents a block diagram of a system for performing anonymization according to one embodiment.

FIG. 8 presents a block diagram of a system for performing anonymization according to one embodiment. System 800 include computing machine 802, event processing system 852, storage 860, user interface devices 854, network 856, and peer computing machine 804. Event processing system 852 is a system such as described earlier in relation to FIG. 1. User interface devices 854 include devices used to display or present information to a human user and to permit the human user to generate signaling information to the computer system. User interface devices 854 may include, without limitation, keyboards, mice, touchpads, video monitors, LCD screens, haptics devices, touchscreens, microphones, speakers, headsets, head mounted displays, video cameras, and motion sensing devices and systems.

Computing machine 802 include memory 820, processor 812, I/O 814, and network interface 816. Memory includes anonymizer 822, application 824, and OS 826. Processor 812 is coupled to memory 824 access to and storage of data and computer program code. Processor 812 is also coupled to a I/O circuitry 814 to effect communication with circuitry and computing devices both inside and external to computing machine 802. Processor 812 is similarly coupled to net interface 816 to effect communication using data network technologies. I/O circuitry 814 and network interface 816 are each coupled to memory 820 to improve operational speed. OS 826 is the executing operating system of computing machine 802 that provides a stable operating platform and basic services to support applications such as anonymizer 822 and peer application 824. Peer application 824 may be, for example a simulation application that can receive as input anonymized event data produced by anonymizer 822.

Anonymizer 822 includes GUI 830, EPS interface 832, configuration 834, output 836, and data 838. GUI 830 includes computer program instructions and data related to causing the display of screen images with interactive components and to receiving and responding to user inputs indicating interaction with those components. The interaction may take place using user interface devices 854 or user interface devices as may be associated with a peer computing machine 804 communicating over network 856. EPS interface 832 includes computer program instructions and data related to requesting services from an event processing system 852, and receiving and processing responses. Configuration 834 includes computer program instructions and data related to creating, storing, using, and maintaining anonymization configurations. Output 836 includes computer program instructions and data related to performing anonymization operations to produce anonymized data in accordance with an anonymization configuration. Data 838 includes data storage as may be required to hold information during the processing of other anonymizer components. Data 838 may include storage for temporary data sets, work in progress, such as anonymization configurations under development, subsets of event data, simulated anonymized data, and the like.

Storage 860 includes configuration data store 862, anonymized data 864, and anonymizer 866. Storage 860 generally represents available data storage space on any number and configuration of persistent storage devices whether located locally or accessed via network connections. Storage of 860 may include fixed media and removable media devices, having solid state, optical, magnetic, magnetooptical, or other storage media and systems. Configuration data store 862 include stored representations of anonymization configurations. Anonymized data 864 includes representations of source event data transformed by an anonymization process to reduce the sensitivity of its contents. Anonymizer 866 includes persistent state forms of GUI 830, EPS interface 832, configuration 834, output 836, data 838, and any other related data.

Peer computing machine 804 includes the application 806 for receiving anonymized event data.

2.3 Interactive Configuration

Figure 9:
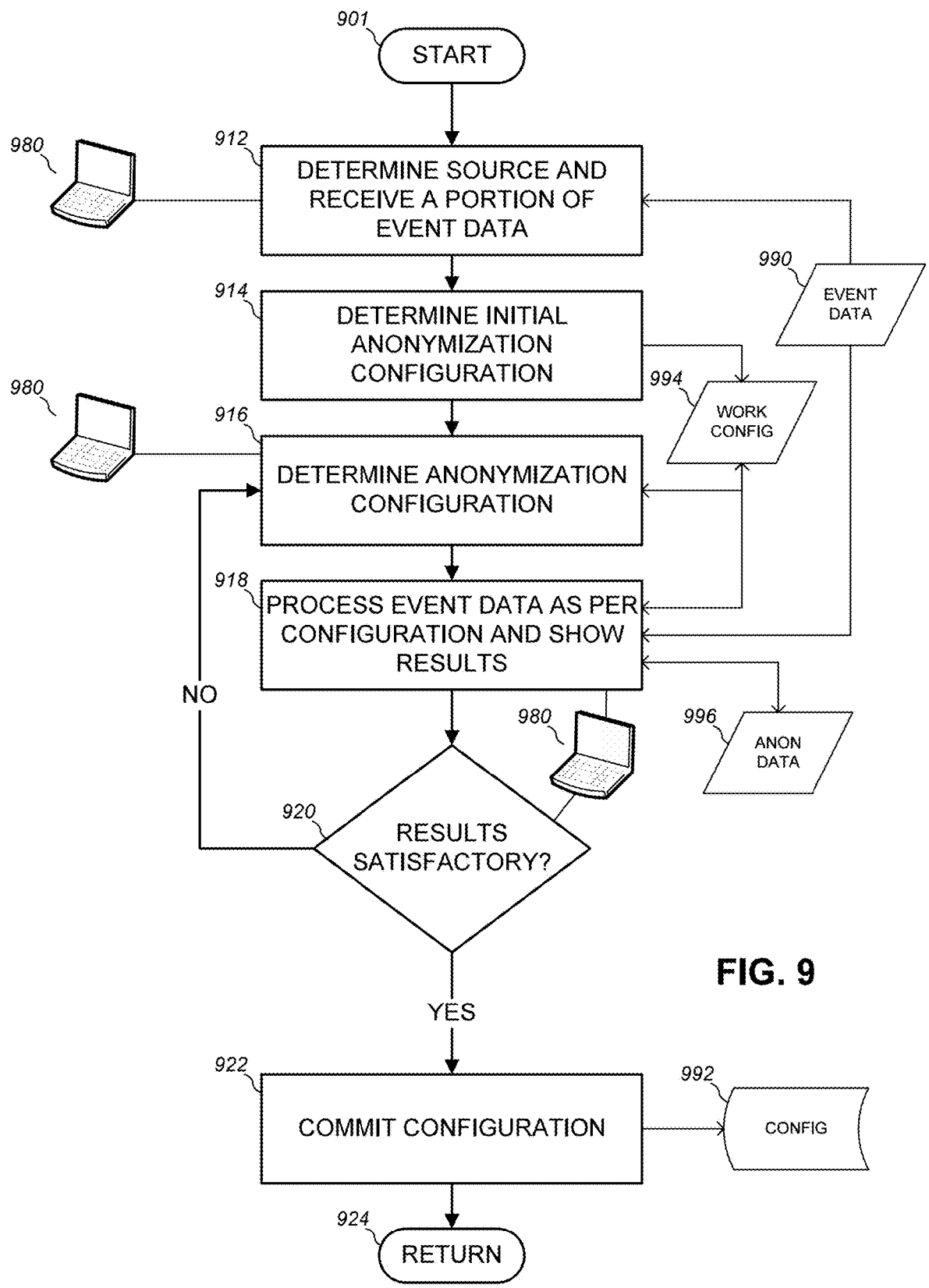
FIG. 9 presents a flowchart illustrating the interactive configuration in one embodiment for an anonymization process.

FIG. 9 presents a flowchart illustrating the interactive configuration for an anonymization process in one embodiment. The interactive configuration process presented by FIG. 9 has, as one output, an anonymization configuration 992. An anonymization configuration is a dataset or portion having information to direct the transformation of clear (non-anonymized) event data to an anonymized form. An anonymization configuration in one embodiment includes information about one or more sources of event data as well as criteria for one or more layers or instances of filtering applied to event data. The method may be performed by processing logic that may comprise hardware (circuitry, dedicated logic, etc.), software (such as is run on a general purpose computer system or a dedicated machine), or a combination of both. In one implementation, the method is performed by the client computing machine. In another implementation, the method is performed by a server computing machine coupled to the client computing machine over one or more networks.

At block 901, the process starts. At block 912, a source of event data is determined. In one embodiment, a source of event data is determined by displaying a GUI enabling a user to specify the source of event data which is to be anonymized, and responding to user interaction with the GUI to specify a source of event data. The display of the GUI and the user interaction are represented by block 980. An embodiment may employ one or more GUI elements enabling the user to specify a source of event data, such as, a text box for direct user input, a list box pre-populated with a list of available event data sources, a combo box similarly pre-populated, or a group of radio buttons or checkboxes each corresponding to an available event data source, for example. An available event data source may be any type of data repository that can provide event data. In one embodiment, event data includes raw machine data. In one embodiment, event data includes a timestamp, possibly as a metadata field. In another embodiment, event data includes metadata fields for the event including host, source, and source type fields. In yet another embodiment, event data includes tag information for raw machine data to identify particular information items or field values within the raw data, for example. An embodiment may support one or more different types of possible data sources. Supported event data source types may include, for example, a database or database connection, a file maintained under the file system of the host OS such as a CSV file, a network connection supplying streamed event data, or search query or the results produced from a search query executed using an event processing system (EPS) such as system 100 of FIG. 1, or the data stores of an EPS such as 103 of FIG. 1.

Returning to block 912 of FIG. 9, the determined source of event data may be a filtered or unfiltered source. In one embodiment, displayed GUI elements enable a user to specify filtering or selection criteria that are used for a search query in an EPS. The criteria specified by user interaction with the GUI are retained by the anonymizer as information for specifying or determining an event data source. The criteria may specify, for example, a time range for event timestamps to fall within, or a field that must match a specific value, or range of values, wildcard pattern, or the like. In the embodiment, at the time to retrieve event data from the determined source, information for the search query including the filtering criteria are conveyed to the EPS. The EPS applies the filtering criteria and returns to the anonymizer a search query result having only event data matching the criteria. The anonymizer does not see non-matching event data. Accordingly, the EPS search query is a filtered source.

In another embodiment, displayed GUI elements enable user to specify filtering or selection criteria that are used to filter records from a CSV file event source. Again the criteria specified by user interaction with the GUI are retained by the anonymizer as information for specifying or determining an event data source. The criteria may specify, for example, a time range for a time field value to fall within, or a field position that must match a specific value, or range of values, wildcard pattern, or the like. In this embodiment, at the time to retrieve event data from the determined CSV source, the anonymizer receives event data from the CSV without regard to the filtering criteria and the anonymizer accepts or rejects CSV event data based on it matching or not matching the criteria. In this embodiment, the anonymizer sees matching and non-matching event data and applies the filtering criteria itself. Accordingly, the CSV file of this embodiment is a non-filtered source.

In one embodiment, filter criteria associated with an event data source is development filter criteria and is applied to the data source events during the process of determining an anonymization configuration such as that described in relation to FIG. 9. The development filter criteria is not applied to the data source events during a process of producing an anonymized event dataset for that embodiment, such as the process described in relation to FIG. 21. The development filter criteria provide a way to speed the development process by limiting the volume of data processed in support of development. In another embodiment supporting development filter criteria, production filter criteria may also be specified. In this embodiment, the production filter criteria are applied to the data source events during the process of producing an anonymized event data set for the embodiment, such as by the process described in relation to FIG. 21. In this embodiment, the production filter criteria are stored as part of the anonymization configuration (discussed below in relation to block 922).

In another embodiment, filter criteria associated with an event data source is general filter criteria and is applied to the data source events regardless of whether the data source is being accessed for development or for production. In another embodiment, filter criteria associated with an event data source are specified by anonymizer defaults that may or may not be explicitly presented to the user for active or passive acceptance via the GUI.

Further at block 912, once an event data source is determined, the data source is accessed and the anonymizer receives a portion of the event data from the source. The portion may be less than or all of the event data available from the source. The portion may be less than or all of the data pertaining to each event, for some or all of the events available from the source.

In receiving a portion of the event data from the source the anonymizer may apply filtering. For an unfiltered data source the anonymizer may apply default or user supplied filter criteria as earlier discussed. Additional filtering may be applied regardless of whether the event data source is filtered or unfiltered. In one embodiment the additional filtering criteria are retained distinctly from event source filter criteria already discussed. The additional filtering criteria of an embodiment may include, for example, sampling criteria that further down-selects event data from the now-filtered source event data (whether filtered at the source or by the anonymizer).

The event dataset received by acquiring event data from the event data source and applying any filtering criteria, including any down-selection, is the configuration event data (represented in FIG. 9 by block 990). In one embodiment the configuration event data 990 is the data repository of event data that may used for display, analysis, simulation, and testing during the development of an anonymization configuration including the specification and proving of the configuration.

The determination and receiving of block 912 is an iterative process in one embodiment. The user is enabled to supply via the GUI information specifying one or more event data sources, filter criteria related to each data source, filter criteria applied across data sources, and filter criteria applied to the aggregated filtered event data of the data sources (collectively, the configuration event data sourcing specification). As the anonymizer receives input based on the user interaction with the GUI, it can update its retained record of user-specified information and access the one or more event data sources to receive a portion of event data in accordance with the most recent user-specified information. The received portion of event data refreshes configuration event data 990. The embodiment then may refresh a portion of the GUI displaying information from or about the configuration event data, providing feedback to the user about any effect caused by recent interactions with the GUI to supply information for the configuration event data sourcing specification. Based on this feedback, the user may again interact with the GUI to direct a further change to the configuration event data sourcing specification, starting the cycle again. The embodiment may perform the processing to refresh the configuration event data and update the GUI display in response to any change by the user to the configuration event data sourcing specification, in response to a specific user input signaling that refresh/update processing is desired such as clicking a command button, or based on some other criteria.

At block 914, an initial anonymization configuration is determined. An initial anonymization configuration may contain information determined by anonymizer defaults. For example, information in an initial anonymization configuration may indicate that all unknown text of an event should be anonymized with random characters, and that all unspecified fields should be anonymized with random characters, based on defaults for the anonymizer. An initial anonymization configuration may contain information determined by analysis of configuration event data. For example, information of the initial anonymization configuration may indicate that the data of an event corresponding to a field via an extraction rule should have its numeric portions anonymized using a random digits substitution method and that the field should be anonymized with consistency, based on an analysis determining that the field contains an IP address. As another example, information of the initial anonymization configuration may indicate that the data of an event that may correspond to fields in accordance with extraction rules, should be anonymized using a list substitution method, based on an analysis determining that the field contains the state portion of the United States mailing address. An initial anonymization configuration may contain information determined based on inputs from prior user interaction with the GUI. For example, information of the initial anonymization configuration may indicate that a particular field is to be anonymized using a map method and a particular mapping, based on the user previously supplying a user ID, the user ID being associated with the stored particular mapping, and an analysis determining that the field contains data relating to the mapping. Other sources and means of determining information for an initial anonymization configuration are possible.

At block 916, an anonymization configuration is determined. Determination of an anonymization configuration starts from a point where an anonymization configuration has been initially populated with information such as the working configuration 994 resulting from the processing of block 914, previously described. In an embodiment omitting the determination of an initial anonymization configuration, determination of an anonymization configuration starts from a point where little to no anonymization configuration information is populated. Generally stated, the processing of block 916 includes displaying information from a current working configuration to a user via a GUI, receiving input from user interaction with the GUI to specify information for the working configuration (by additions, changes, or deletions, for example), and reflecting the information so specified in a working configuration 994. Working configuration 994 is an anonymization configuration under development or modification. In one embodiment, a working configuration utilizes the same data representation format as a completed, final, or production anonymization configuration that is actively in use. In one embodiment, an anonymization configuration that is actively in use utilizes the same data representation format as a stored anonymization configuration. In one embodiment, an anonymization configuration that is actively in use is represented as a data structure in memory. In one embodiment, an anonymization configuration that is actively in use is represented as a collection of programming objects. The variety of information in an anonymization configuration, including the working configuration 994, as well as a variety of illustrative ways to achieve user interaction, will be readily apparent after studying FIGS. 11-19 and the related discussion appearing elsewhere in this Detailed Description.

At block 918, event data is processed according to the determined anonymization configuration and results are displayed to the user. In one embodiment, all of the configuration event data 990 is anonymized in accordance with the working anonymization configuration 994, producing anonymized data 996. Information from and about anonymized data 996 may then be presented to the user via a GUI as indicated by block 980. Information from anonymized data 996 may include one or more event records in anonymized form. Information about anonymized data 996 may include statistics or summary information for anonymized data 996. In another embodiment, a filtered selection of event data 990 is anonymized in accordance with the working anonymization configuration 994 producing anonymized data 996, and information related to anonymized data 996 is presented as before. The filtered selection of event data is produced using filter criteria designated as test-run filter criteria.

Figure 21:
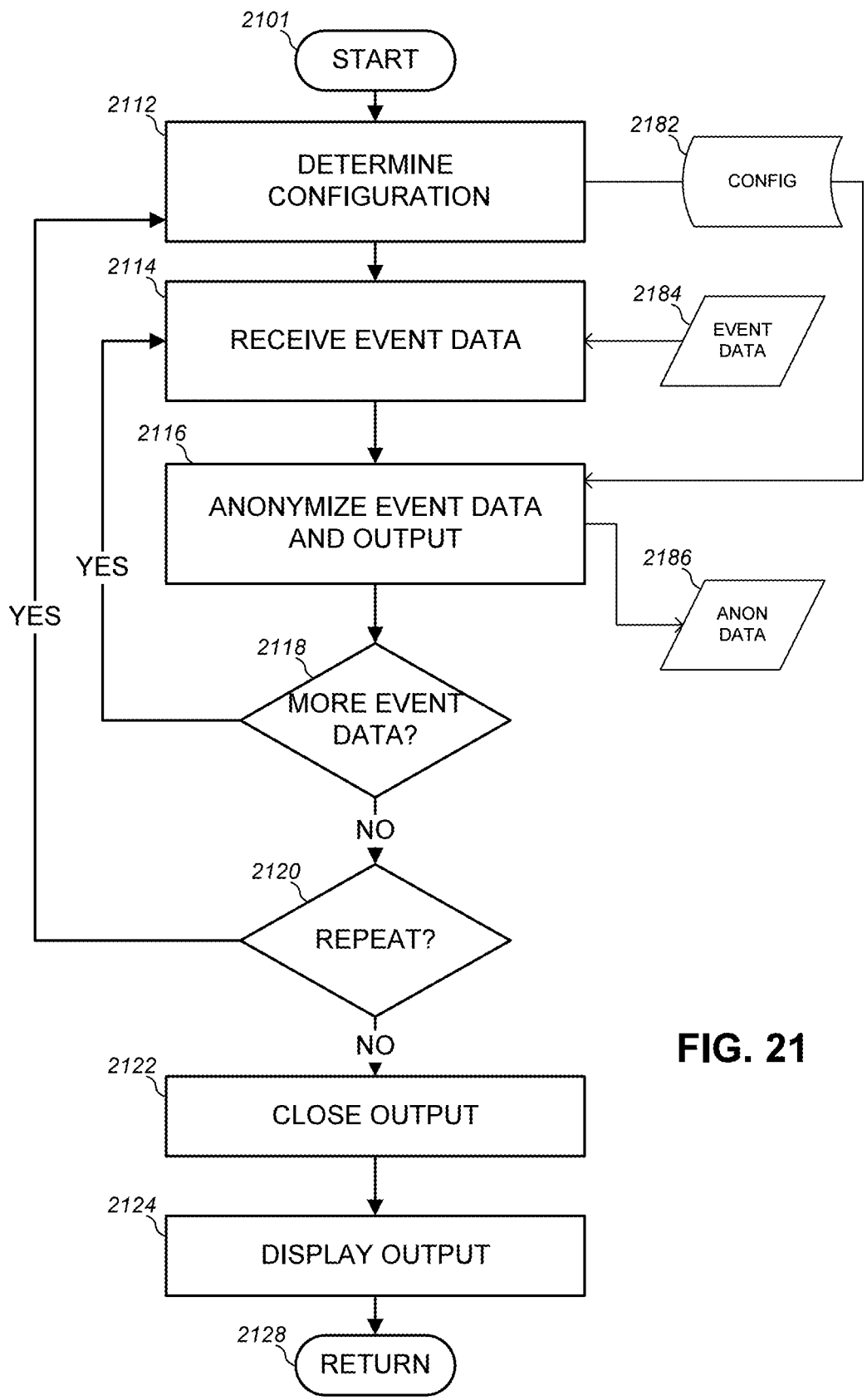
FIG. 21 presents a flowchart illustrating an anonymization process. The illustrated anonymization process of FIG. 21 anonymizes event data 2184 in accordance with a stored configuration 2182 producing and output data set or data repository of anonymized data 2186.

The anonymization of event data of block 918 during the development phase where an anonymization configuration is being determined, parallels production anonymization processing described in relation to FIG. 21. Accordingly, one of skill in the art recognizes the opportunity to use a common code base to perform anonymization whether at development time or at production time, where the event data sourcing (including all filtering) may differ and the information required of an anonymization configuration may differ (even if substantially overlapping).

At block 920 a determination is made whether the current anonymization configuration is deemed to produce satisfactory results. In one embodiment the determination is made based on input received from user interaction with the GUI as signified by block 980. If the results are not deemed satisfactory, processing returns to block 916 where the user is enabled to again provide information about the anonymization configuration. In one embodiment, the information then provided in relation to block 916 is used to update a current working anonymization configuration. If the results are deemed satisfactory, processing proceeds to block 922.

In one embodiment, a GUI enabling a user to indicate satisfaction with the results of an anonymization may further enable the user to access test results, where the test results are not the anonymized data, itself, but rather an analysis of the anonymized data. For example, an analysis of anonymized data may include determining whether any anonymized IP address appearing in the anonymized data perchance appears as an IP address in original clear event data, possibly undercutting the effectiveness of the anonymization. A user presented with such test results may be inclined to indicate that the results of the anonymization are not satisfactory so that they might be returned to the processing of block 916 where they can further refine the anonymization configuration so as to avoid a duplicate poor test result.

At block 922, an anonymization configuration is committed to storage. In one embodiment committing an anonymization configuration to storage involves transforming the working anonymization configuration, in whole or in part, to an anonymization configuration storage format. In another embodiment, committing an anonymization configuration to storage involves no transformation of the working anonymization configuration. In an embodiment, committing an anonymization configuration to storage may involve committing the anonymization configuration to a persistent storage system or device.

At block 924, the interactive configuration process of one embodiment depicted by FIG. 9 completes and control is returned to a calling process which determines subsequent activity. One of skill appreciates that not all of the processing described for any of the blocks, nor any or all of the processing described for all of the blocks, depicted in FIG. 9, is required in any particular embodiment. One of skill further appreciates that processing described in relation to FIG. 9 need not necessarily be conducted in the order described, implied, or depicted in relation to FIG. 9. One of skill further appreciates that collections of data such as the configuration event data 990, the working anonymization configuration 994, and the anonymization configuration 992, for example, represent logical data collections in an embodiment that may or may not each correspond to a single stored data location or representation.

Figure 10:
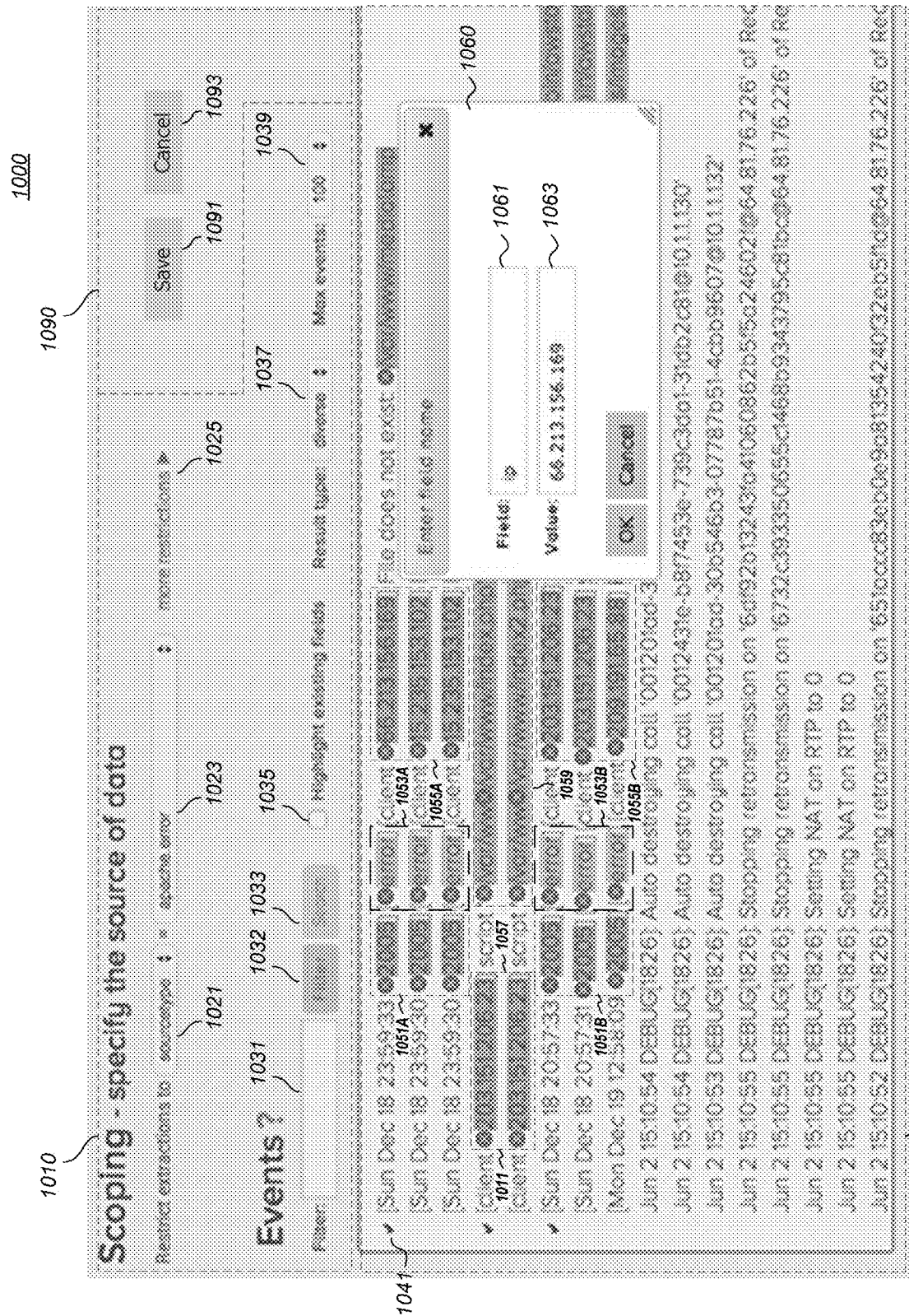
FIG. 10 illustrates a graphical user interface (GUI) display in accordance with disclosed embodiments.

FIG. 10 illustrates a graphical user interface (GUI) display in accordance with disclosed embodiments. GUI display 1000 may be useful in an embodiment throughout the processing depicted in FIG. 9, in large part. GUI display 1000 includes scoping portion 1010, data portion 1040, and disposition portion 1090. Scoping portion 1010 displays various settings, and enables the user to interact to introduce or modify those settings. The settings of GUI portion 1010 relate to specifying the data source for the anonymization process, i.e., the data that is to be anonymized. Scoping portion 1010 is populated in FIG. 10 with GUI elements related to using a search query in an event processing system as the data source. Scoping portion 1010 may be populated differently than in FIG. 10 where a different data source is to be specified. For example, scoping portion 1010 may include GUI elements related to specifying a filename, file format, and directory location when specifying a general filesystem file, e.g., such as a CSV file, as the data source providing the clear data to be anonymized.

Scoping portion 1010 includes a variety of GUI elements including fieldname selector 1021, field value selector 1023, "more restrictions" link 1025, filter box 1031, filter button 1032, search button 1033, highlight check box 1035, result type selector 1037, and "Max events" selector 1039. Fieldname selector 1021 and field value selector 1023 enable a user to specify search criteria as may be used in a search query supplying the data for an anonymization process. Fieldname selector 1021 is shown with the displayed text value indicating the name of a metadata field (i.e., "sourcetype") and a spin-control double arrowhead. In one embodiment, a user is enabled to select the text portion of the fieldname selector to add, change, or delete the displayed field name. In one embodiment, a user may interact with the spin-control to cycle through a list of available field names. The list of available field names may be populated, for example, using a static list or by retrieving a list, such as a list of metadata fields available in a particular event processing system, a list of fields having rules for extraction in the event processing system, or some combination. In one embodiment, a user may interact with the spin-control or a similar GUI element to activate a drop-down or pop-up list of available field names from which to select a name. Once selected from the list, the field name becomes the displayed text of element 1021.

Field value selector 1023 is shown with the displayed text value indicating a possible value (i.e., "apache.error") for the field selected in 1021. A user may be enabled to specify a field value using GUI element 1023 in similar fashion as described for specifying a fieldname using element 1021. List information used in conjunction with metadata field value element 1023 will be populated with possible field value information, rather than name information. The list of available field values may be populated, for example, using a static list or by dynamically retrieving a list, such as a list of field values extracted from actual event data of the event processing system using an extraction rule associated with the fieldname selected in 1021.

The fieldname specified in 1021 and the match value specified in 1023 may be used together as one search criterion for a search query in the event processing system. As the user interacts to introduce or change the displayed contents of fieldname selector 1021 and field value selector 1023, a search query may be performed to supply compliant event data that can be displayed in data portion 1040, providing feedback to the user regarding their choices. In response to this feedback, the user may change the contents of 1021 or 1023 to achieve a better result. For example, the user may introduce a wildcard character into field value selector 1023 to expand the scope of the search criteria in the hope of seeing more satisfying results in data portion 1040 when the search query is rerun using the updated search criterion.

GUI 1000 enables a user to specify multiple criterion for the search query criteria. In one embodiment, the user can click on the "=" (i.e., equal sign) appearing between selectors 1021 and 1023 to indicate satisfaction with their displayed contents. The computer system in response saves the values from the selectors as an active search criterion, and clears the displayed contents of selectors 1021 and 1023 to await the possible entry of an additional search criterion using those selectors. The user may interact with link element 1025 (for example, with a mouse click or finger touch) in order to display a GUI element presenting all of the active search criteria. In one embodiment, the user may interact with link element 1025 in order to display a GUI element presenting all of the active search criteria in GUI elements enabling a more robust specification of search criteria than provided by selectors 1021 and 1023, alone, or even in combination with filter box 1031, "result type" selector 1037, and "Max events" selector 1039.

Filter box 1031 enables a user to specify filter criteria in addition to any search criteria specified using selectors 1021 and 1023 as discussed above. As the filter criteria are additive, if effective, they will further restrict the selection of event data, reducing the amount of event data available for display in data portion 1040. The functionality provided here by the computing system through the GUI enables a user to be very selective about the data she is viewing in data portion 1040, which can aid in focus to speed the determination of a useful anonymization configuration. In one embodiment, filter box 1031 enables a user to provide text to specify the additional filter criteria. The text may be a segment, a complete statement, or a complete program in a computer programming, scripting, or pattern matching language. Examples include Python, JavaScript, and regex. In one embodiment, filter box 1031 enables a user to specify the name of filter criteria previously entered and saved.

Result type selector 1037 enables a user to specify a sampling filter criteria. Any sampling filter criteria specified using "Result type" selector 1037 is additive to search criteria specified using selectors 1021 and 1023, and filter criteria specified using filter box 1031. Result type selector 1037 is shown with the displayed text value indicating a "diverse" sampling type and a spin-control double arrowhead. In one embodiment, a user is enabled to activate the text portion of the result type selector 1037 to add, change, or delete the displayed result type using a keyboard, or voice recognition, or the like. Auto-complete options may be provided for the result type. In one embodiment, a user may interact with the spin-control to cycle through a list of available result sampling types. The list of available result types may be populated, for example, using a static list or by dynamically retrieving a list, such as a configurable list of supported result sampling types. In one embodiment, a user may interact with the spin-control or a similar GUI element to activate a drop-down or pop-up list of available result types. Once selected from the list, the result type becomes the displayed text of element 1037.

In one embodiment, the list of available result sampling types includes latest, earliest, diverse, outlier, random, and other sampling types. The "latest" sampling type filters to produce a subset of data containing only the most recent events. The "earliest" sampling type filters to produce a subset of data containing only the least recent events. The "diverse" sampling type filters to produce a subset of data by using a small number (e.g., 3) of sample events from each of the most common groups of events, in one embodiment. A variety of criteria may be used to group events for diverse sampling; for example, events may be grouped together based on their terms, structure, punctuation, or other factors. The "outlier" sampling type filters to produce a subset of data by using a small number (e.g., 3) of sample events from each of the least common types of events. Grouping criteria may be the same as for the "diverse" sampling type. The "random" sampling type filters to produce a subset of data by random sampling of the events. Other sampling techniques are possible.

The "Max events" selector 1039 enables a user to specify a numeric limit to the number of events that will be anonymized. Any sampling filter criteria specified using is additive to search criteria specified using selectors 1021 and 1023, filter criteria specified using filter box 1031, and sampling filter criteria specified using result type selector 1037, in one embodiment. "Max events" selector 1039 is shown with the displayed text value indicating a maximum sample size of "100" and a spin-control double arrowhead. In one embodiment, a user is enabled to activate the text portion of the "Max events" selector 1039 to add, change, or delete the displayed maximum sample size value. In one embodiment, a user may interact with the spin-control to cycle through a list of available maximum sample size values. Selection of a spin-control directional arrow may result in the increment or decrement of the displayed maximum sample size by one, by fixed increments (e.g. 10, 50, or 100), or by varying increments (e.g. by tens until 100, by 50 s until 500, by hundreds until 1000, and so on).

Filter button 1032 enables the user to direct the computing system to apply the filter criteria of 1031, sampling criteria of 1037, and sample size criteria of 1039 to its current working set of event data that resulted from the last execution of a search query in response to the specification of search criteria using fieldname selector 1021 and field value selector 1023, for example, and to display the filtered result in data area 1040. Search button 1033 enables the user to direct the computing system to cause execution of a new search query in the event processing system using all of the currently specified search and filter criteria, together, as search criteria of the new search query. The results of the newly executed search query become the refreshed current event working set. In one embodiment, filter box 1031, result type selector 1037, and "Max events" selector 1039 are emptied or cleared at the same time, because their most recent contents are already reflected in the current working set of event data. Event data from the refreshed current working set is displayed in data portion 1040.

In one embodiment, the filter criteria specified using filter box 1031, "result type" selector 1037, and "Max events" selector 1039, are development-time search criteria used during the process of determining an anonymization configuration by user interaction with a GUI for prospectively producing anonymized output datasets. While these filter criteria may be stored in an anonymization configuration, they are not used as search criteria for a search query to produce the clear event data that will be anonymized to an external dataset during a production run. (The dataset being external from the standpoint that it is made available for use outside of the process of a user interaction with the GUI to specify the definitional information of an anonymization configuration.) In one embodiment, the filter criteria specified using filter box 1031, "result type" selector 1037, and "Max events" selector 1039, are development-time and production-time search criteria used both during the process of determining an anonymization configuration by user interaction with a GUI for prospectively producing anonymized output datasets, and during the process of actually producing anonymized external datasets in accordance with the determined anonymization configuration. In one embodiment, the filter criteria specified using filter box 1031, "result type" selector 1037, and "Max events" selector 1039, are development-time search criteria, and their production-time use is selectable by the user.

Data area 1040 of GUI 1000 is used to display event data from a current working set of event data produced by a search query in an event processing system and the possible subsequent application of one or more filter criteria, in accordance with the illustrated embodiment. User interaction with GUI elements of scoping portion 1010 establish search criteria for the search query. User interaction with GUI elements of scoping portion 1010 establish filter criteria that may be subsequently applied to search query results. In one embodiment, each line appearing in data portion 1040 displays information related to a single event. In one embodiment, that data includes a timestamp associated with the event, and a portion of raw data identified for the event.

Segments of the data of the event may be distinguished from other of the data. For example, if user input is received indicating the selection of highlight fields checkbox 1035 the computing machine can alter the presentation of certain segments of event data. In one embodiment, the certain segments of event data for which the presentation is altered are identified based on their correspondence to positions recognized for field values by an extraction rule in the event processing system. In such an embodiment, the raw machine data of an event does not contain any fields. Rather, fields are associated with an event with corresponding field values extracted from the raw machine data of the event, by the application of a late-binding schema. The data segments may be distinguished from other data by a variety of methods. For example, the data segments may be distinguished by properties of the displayed text itself, such as the font in which it appears, the size of the font, boldness, color, background color, or another property. The distinguishing property or properties may also vary among the various segments being distinguished. For example, several highlighting color choices may be cycled through for successive segments. The data segments may also be distinguished by inserting additional text indicators in proximity to the segment. For example, the data segments may be distinguished by surrounding each with brackets, braces, parentheses, or other delimiting characters. The data segments may also be distinguished by inserting other graphical elements, such as pictograms or icons, in proximity to the segments. For example, the data segments may be distinguished by leading and/or following each with a colored circle icon. In addition to acting as delimiters, the appearance of each icon or pictogram could convey additional information to the user. In another example, the data segments may be distinguished by placing such a graphical element in the background of the text. Variants and combinations of the above are possible.

In another embodiment, the certain segments of event data for which the presentation is altered are identified based on user interaction with the computer system using GUI 1000, without any necessary regard for the user selection indicated by highlight fields checkbox 1035. Such an embodiment will next be described in relation to GUI 1000. The data of a number of events is displayed in data portion 1040. Each event is displayed on a single line. The GUI enables the user to interact with the text of each event, for example, by enabling the selection of segments within a text line. When the event data is first displayed in data portion 1040 it can have a uniform visual appearance much like the lines in 1040 beginning with the text "Jun 2." Within that text, the user may recognize a segment of text meaningful within the context of the anonymization. For example, a segment of text to be anonymized in a particular fashion, or a segment of text to be protected from anonymization. In the present illustrative example, the user has recognized the value "2005" in the first line of display portion 1040 as a data segment deserving of particular attention. The user provides input to the GUI to identify or select the segment of interest and, in response to that input (such as from a mouse device), the computing machine changes distinguishes the appearance of the identified segment from the surrounding data. When in the illustrative example the user provides input identifying "2005" as a segment of interest, the computing machine distinguishes the appearance of that identified segment by changing the background color as indicated in FIG. 10. The computing machine may further distinguish the appearance of the identified segment by preceding it with an X-out icon (an X in a circle) as shown. The first line of data portion 1040, corresponding to a particular event, further indicates that the user also provided input identifying the "error" text, the "66.213.156.169" text, and the "/var/www/medialamp" text, and the computing machine responded to the input for each by visually distinguishing the segments with alternative background colors and a preceding X-out icon. The illustrative data portion display of FIG. 10 also indicates by the appearance of checkmark 1041 that the user interacted with the GUI to select the first line of event data for additional processing. In the present illustrative example the additional processing includes performing a similarity analysis to identify other events that are likely to have a correspondence with the event selected for additional processing. Various machine learning, statistical, or artificial intelligence methods can be applied to perform such a similarity analysis. As a result of such an analysis in the present illustrative example, the computing machine identified the events represented on the second and third lines of data portion 1040 and duplicated the highlighting (distinguishing visually) of the user identified segments of the first event data with computer-determined corresponding segments in the data of the second and third events. Accordingly, the data segments spanning the first three lines of data portion 1040 at 1051A share the same distinguishing visual appearance, as do the data segments at 1053A, and at 1055A.

As can be further illustrated with regard to FIG. 10, the computing machine can respond to user input for identifying a data segment of interest beyond changing its visual appearance. For example, when the user interacts with the GUI to indicate the identification or selection of the text segment "66.213.156.169" in the data of the first event, the computing machine can also respond by presenting a GUI element such as pop-up 1060 to present information and/or enable user input of information regarding the identified data segment. Pop-up 1060 may, in this illustrative case, display a fieldname-to-data-segment-value association based on an underlying extraction rule. The extraction rule may be an existing extraction rule within the event processing system which the computing machine has identified in response to the user selection of the data segment. In another embodiment, the extraction rule may be a proposed extraction rule proffered by the computing machine based on its analysis of the selected data segment and other known information (for example, known past patterns of data segment identification). In this illustrative example, the computing machine has repeated the content of the identified data segment as the value displaying in value box 1063, and has indicated that an underlying extraction rule can associate that value with a fieldname of "ip" by the display of field box 1061.

In another embodiment, the certain segments of event data for which the presentation is altered are identified based on an analysis made on event data by the computing machine, for example, to provide the user with suggestions for the identification of segment examples useful in developing a field extraction rule. The analysis made on the event data by the computing machine may range from simple pattern recognition within the data of a single event to complex heuristics, other machine learning, and artificial intelligence methods applied across large volumes of event data and brought to bear on the data of a single event.

In one embodiment the X-out icon, in addition to visually distinguishing the segment of user selected data, serves as an interactive GUI element. The user may interact with the element, for example by a mouse click or finger tap, to indicate to the computing machine that the associated data segment is not of interest. In response to such an indication from the user the computing machine can remove the X-out icon and revert the displayed segment text to its original appearance (i.e., remove the background color).

Figure 11:
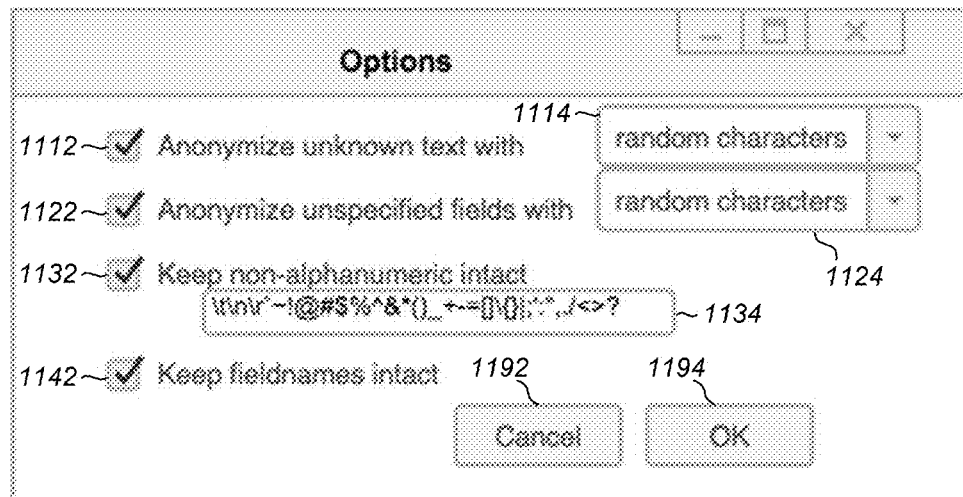
FIG. 11 illustrates a GUI display in accordance with disclosed embodiments for specifying certain anonymization options.

FIG. 11 illustrates a GUI display in accordance with disclosed embodiments for specifying certain anonymization options. One embodiment may present GUI display 1100 to the user while executing a method enabling a user, such as an IT technician, to specify anonymization configuration information. GUI 1100 includes GUI elements to display information related to, and enable user interaction to provide information for specifying, certain options to direct an anonymization process. Such options may be included among the information of an anonymization configuration. Checkbox 1112 allows a user to make an indication whether unknown text within event data should be anonymized during an anonymization process. The unknown text of the event data is the event data for which an extraction rule is not included to associate the data with a fieldname. Drop-down 1114 allows a user to make an indication of a randomization method to apply to the unknown text of an event if the user has selected the anonymization of unknown text using checkbox 1112. The text of drop-down 1114 displays the "random characters" anonymization method which may be an initial default value or may be the result of a user selection action. User interaction with the drop-down button of 1114 displays a list of available randomization methods for user selection. Upon selection of a method in the list, the list is withdrawn and the name of the selected method appears as the text of 1114. Randomization methods as might be useful for the anonymization of unknown text are discussed more fully in relation to FIGS. 14-19.

Checkbox 1122 allows a user to make an indication whether unspecified field data should be anonymized during an anonymization process. The unspecified field data of the event data is the event data for which an extraction rule is included to associate the data with a fieldname, but no anonymization method has been specified in the anonymization configuration for that fieldname. Drop-down 1124 allows a user to make an indication of a randomization method to apply to the unspecified field data of an event if the user has selected the anonymization of unspecified fields using checkbox 1124. Drop-down 1124 operates as drop-down 1114, although the lists of available randomization methods for them may differ.

Checkbox 1132 allows a user to make an indication whether to keep certain non-alphanumeric data intact during an anonymization process. The non-alphanumeric data in one embodiment are character values that serve as punctuation, delimiters, currency symbols, math symbols, or the like. Text box 1134 allows a user to specify the set of characters that are to be preserved as their original, clear event data values during the anonymization process, if the user has selected the option to keep non-alphanumeric data intact using checkbox 1132. Text box 1134 of GUI 1100 displays "\t\n\r`~!@#$%^&*( )_+-=[ ]\{ }|;':,./< >?" and double quotation marks, which may represent a default or user-specified string of characters for preservation.

Checkbox 1142 allows a user to make an indication whether to keep fieldname-like data appearing in the event data intact during an anonymization process. Fieldname-like data may be identified by the computing machine using pattern matching or other analytical techniques. For example, the computing machine may look for a pattern having a first token, followed by an equal sign (=) or colon (:), followed by another token. If the pattern is found, the computing machine may identify the first token as fieldname-like data. Variants of checkbox 1142 may be utilized in other embodiments. For example, in one embodiment checkbox 1142 allows a user to make an indication of whether to keep all (name-value-pair)-like data appearing in the event data intact during an anonymization process. (Name-value-pair)-like data may be identified by the computing machine using pattern matching or other analytical techniques. For example, the computing machine may look for a pattern having a first token, followed by an equal sign (=) or colon (:), followed by another token. If the pattern is found, the computing machine may identify the data matching the pattern as (name-value-pair)-like data and preserve the data through the anonymization process if the user has indicated the selection for the checkbox 1142 of this embodiment. For another variant implemented in one embodiment, for example, checkbox 1142 allows a user to make an indication of whether to keep unspecified (name-value-pair)-like data appearing in the event data intact during an anonymization process. Unspecified (name-value-pair)-like data may be identified by the computing machine using pattern matching or other analytical techniques. For example, the computing machine may look for a pattern having a first token, followed by an equal sign (=) or colon (:), followed by another token. If the pattern is found, the computing machine may identify the data matching the pattern as (name-value-pair)-like data. Then a determination is made whether the second token corresponds to a value in an extraction rule associated with the anonymization configuration. If it does not, then the data matching the pattern can be recognized as unspecified (name-value-pair)-like data that will be preserved through the anonymization process if the user has indicated a selection for the checkbox 1142 of this embodiment.

The anonymization options indicated by the foregoing GUI elements at the time the OK button 1194 is activated by the user, whether default settings or explicit user specifications, are stored as information for an anonymization options component of an anonymization configuration.

Figure 12:
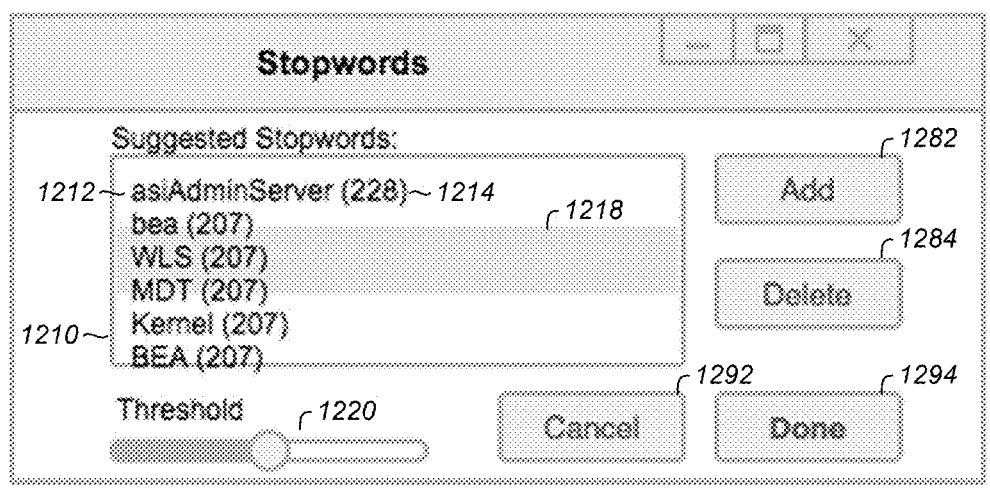
FIG. 12 illustrates a GUI display in accordance with disclosed embodiments for specifying stopwords.

FIG. 12 illustrates a GUI display in accordance with disclosed embodiments for specifying stopwords. FIG. 12 illustrates a GUI display in accordance with disclosed embodiments for specifying stopword anonymization options. One embodiment may present GUI display 1200 to the user while executing a method enabling a user, such as an IT technician, to specify anonymization configuration information. GUI 1200 includes GUI elements to display information related to, and enable user interaction to provide information for specifying, certain stopword options to direct an anonymization process. Such options may be included among the information of an anonymization configuration. A list of suggested stopwords, such as stopword 1212, appears in list box 1210 of GUI 1200. Stopwords are words, terms, phrases, or character strings that are to be preserved and presented unchanged in the output of an anonymization process if found in the original, clear event data. In one embodiment, a stopword is not protected from anonymization if the stopword is at a position that is determined by an included extraction rule to correspond to a field value. A suggested stopword appears as an item in list box 1210. For example, the suggested stopword "asiAdmin-Server" 1212 appears in list box 1210, followed by an indication of the number of occurrences of the stopword in the current working set of event data (e.g., "228" 1214). In one embodiment list box 1210 enables the user to select individual suggested stopwords, select a range of suggested stopwords, and multi-select suggested stopwords from among those appearing in list box 1210. List box 1210 may be scrollable. Items within this box 1210 that have been indicated for selection may be highlighted to distinguish them, for example, by changing their background color as represented by background color area 1218 for multiple consecutive list items, such as "WLS" and "MDT." GUI 1200 enables a user to provide input for directing an action to be taken with regard to currently selected list items. If the user wants the currently selected suggested stopwords of list box 1210 to be included in the stopword information of the anonymization configuration, the user can activate Add button 1282 to add the selected stopwords to a working list of stopwords, and to remove them from list box 1210 as their disposition has been determined. If the user wants the currently selected suggested stopwords of list box 1210 to be excluded from the stopword information of the anonymization configuration, the user can activate Delete button 1284 to remove them from list box 1210 as their disposition has been determined.

An embodiment may use one or more methods to determine the list of suggested stopwords appearing in list box 1210. In one embodiment, the list of suggested stopwords may come from the list of known common words. For example, words like "is", "the", "and", and the like, are common and typically reveal little sensitive information. Preserving them in the output of the anonymization process can make the anonymized data more readable without compromising the security intended by the anonymization. In one embodiment, an entire dictionary of such common, innocuous words may always be treated as stopwords by the anonymization process without requiring the user to specifically indicate their use as stopwords, for example, by using GUI 1200. In one embodiment, the list of suggested stopwords may be determined by identifying potential stopwords that appear close in proximity to established stopwords. In one embodiment, the list of suggested stopwords may be determined by an analysis of the number of occurrences or the frequency of the potential stopword in the current working event data, or in a broader pool of data. When such an analysis is used a GUI element such as threshold slider 1220 may enable a user to set a level for the number of occurrences or for the frequency of occurrence that the potential stopword must satisfy in order to appear in the list of list box 1210. In one embodiment, lists of stopwords, including lists that may be determined for a particular anonymization configuration by a user using, for example, GUI 1200, may be named and saved for future use. In such an embodiment, the names of saved stopword lists may appear in the list of suggested stopwords of list box 1210. By activating the Add button 1282 while the name of such a list is shown as selected in list box 1210, the user can direct a computing machine to collectively or individually add the stopwords of the named list to the working stopword list such that all of the stopwords of the named list will be utilized as stopwords during an anonymization process utilizing the anonymization configuration under development.

GUI 1200 enables the user to indicate a satisfactory conclusion to the process of identifying stopwords using GUI 1200 by means of the Done button GUI element 1294. The user activation of Done button 1294 directs the computing machine to represent the stopwords of the working stopword list in the stopword information of the anonymization configuration under development and to withdraw GUI 1200 from display. GUI 1200 enables the user to indicate an unsatisfactory conclusion to the process of identifying stopwords using GUI 1200 by means of the Cancel button GUI element 1292. The user activation of Cancel button 1292 directs the computing machine to abandon the working stopword list and to withdraw GUI 1200 from display.

Figure 13:
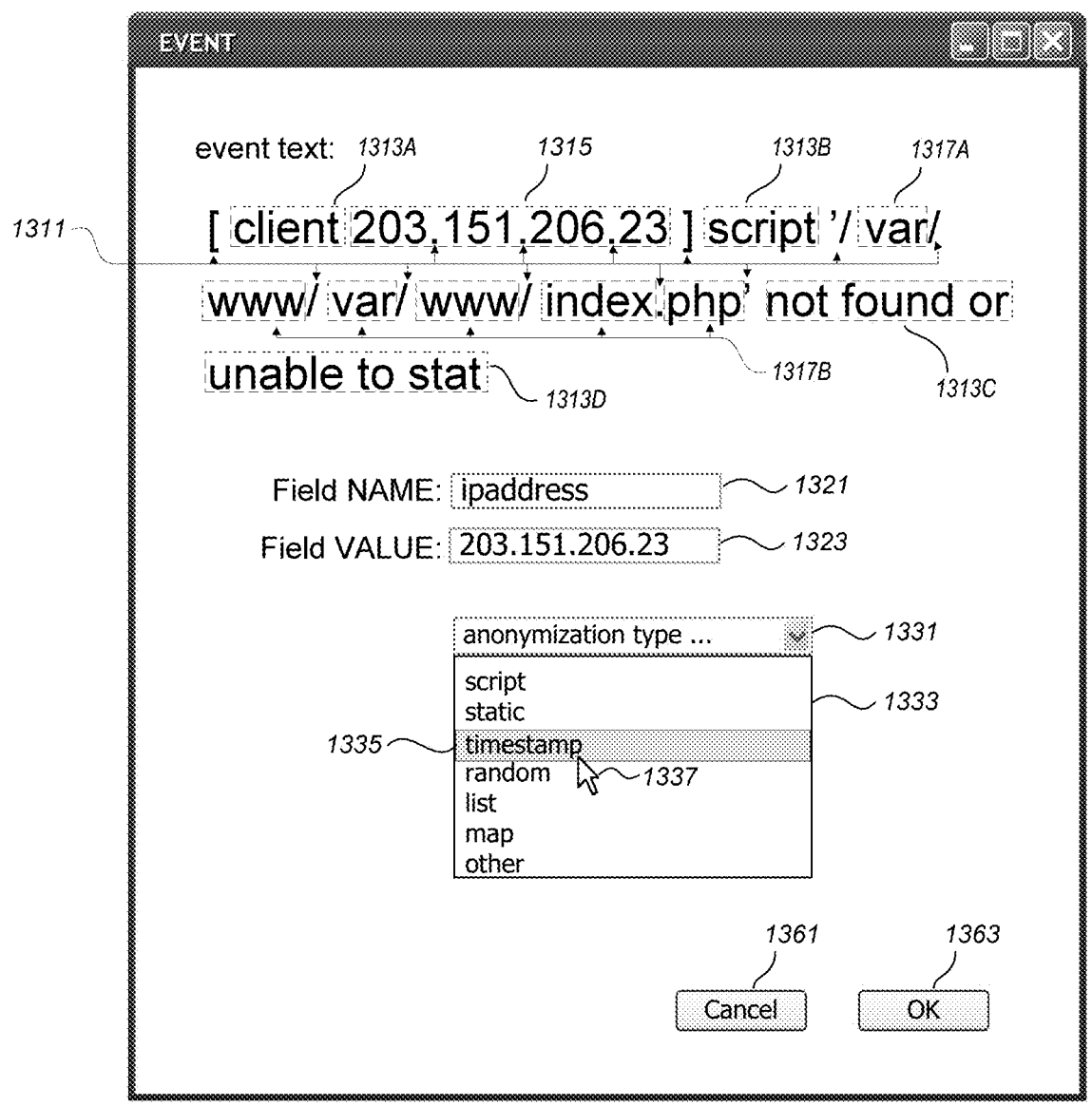
FIG. 13 illustrates a GUI display in accordance with disclosed embodiments for displaying event data and specifying certain anonymization options.

FIG. 13 illustrates a GUI display in accordance with disclosed embodiments for displaying event data and specifying certain anonymization options. FIG. 13 illustrates a GUI display in accordance with disclosed embodiments for specifying an anonymization method to be associated with a segment of event data that corresponds to the field value of an extraction rule. A detail anonymization view of the event data containing the segment is included in the GUI. One embodiment may present GUI display 1300 to the user while executing a method enabling a user, such as an IT technician, to specify anonymization configuration information. GUI 1300 includes GUI elements to display information related to, and enable user interaction to provide information for specifying, certain anonymization method options to direct an anonymization process. Such options may be included among the information of an anonymization configuration. GUI 1300 may be displayed, for example, in response to a user engaging in a particular interaction with the display of data for a particular event in, for example, GUI 1000 of FIG. 10. The particular interaction may be double-clicking the display of data, or the like. In response to the double-clicking, GUI 1300 of FIG. 13 is caused to be displayed to the user.

An event text portion of GUI 1300 displays the text of the event that is implicated in causing the display of GUI 1300. The event text portion of GUI 1300, for illustration purposes, displays the event text "[client 203.151.206.23] script'/var/www/var/www/index.php' not found or unable to stat" in recognition of the anonymization configuration as currently specified. For example, the non-alphanumeric characters of the event data matching those that are specified to be maintained intact using an anonymization options GUI (such as 1100 of FIG. 11) 1311 may be displayed in a red font; words, terms, phrases, or character strings matching stopwords of the anonymization configuration specified using a stopword options GUI (such as 1200 of FIG. 12) 1313A-1313D may be displayed in a yellow font; event data having a correspondence to a field value by application of an extraction rule 1315 may be displayed in green; and the remaining event data that may be recognized as unknown text 1317A-1317B can be displayed in a blue font; for example. Other colors may be used, and one or more means of visual indication other than font color may be used in a particular embodiment. Related teachings can be found elsewhere in this disclosure. Color coding of the event text, or any comparable means of distinguishing segments of event data, provides an effective means of conveying the effects of the anonymization configuration as currently specified.

The text displayed for field value box 1323 shows the value of the event data portion 1315. Event data portion 1315 was said to be color-coded as event data having a correspondence to a field value by application of an extraction rule and, so, it appears in field value box 1323. Event data segment 1315 may have been caused to appear in field value box 1323 because it is the first segment of the event text having a correspondence to a field value, or because it was particularly identified during the user interaction that led to the display of GUI 1300, or because it was indicated for selection by user interaction with GUI 1300, or for other reasons. Fieldname box 1321 has text displaying "ipaddress"—the fieldname associated with the underlying extraction rule.

The presence of a fieldname in fieldname box 1321 and of a field value in field value box 1323 indicates that a particular extraction rule is identified in relation to GUI 1300 and the particular event it displays. Anonymization method drop-down 1331 may, in some embodiments, be disabled, deactivated, or hidden until that condition is true. With that condition satisfied, anonymization method drop-down 1331 enables a user to select an anonymization method to apply to the event data segment corresponding to the value of the extraction rule for every event from the anonymization data source to which the extraction rule may apply. (In one embodiment, the selected anonymization method applies to all extraction rules applied to event data from the source that yield the same field name.) A user may interact with the drop-down button portion of drop-down 1331 to provide input that causes the computing machine to display drop-down list 1333. Drop-down list 1333 displays a list of available anonymization methods that may be applied to various types of data that may occur within event records. Drop-down list 1333 may be populated by a static list or by dynamically retrieving a list, such as a configurable list of supported anonymization methods. The user is unable to interact with drop-down list 1333 by, for example, moving a pointer indicator 1337 with mouse or finger movements over a particular entry in the list, such as the "timestamp" entry 1335, to identify it for selection. Once the desired anonymization method is identified for selection, the user can signal the selection to GUI 1300 by, for example, a mouse button click or a finger tap. In response to the user input signaling the selection, the computing machine withdraws the display of drop-down list 1333 and places the identifier of the selected anonymization method in the text portion of drop-down box 1331. On the basis of the user input signaling the selection, or on the basis of the user activating OK button 1363, the computing machine can represent the association between the extraction rule (or the fieldname) and the anonymization method as a component of the information of the anonymization configuration, in one embodiment. In one embodiment, on the basis of the user input signaling the selection, or on the basis of the user activating OK button 1363, the computing machine can cause the display of a GUI portion enabling the user to customize the anonymization method. In one embodiment each anonymization method corresponds to a particular GUI portion enabling the user to customize. Such method-specific GUI portions are illustrated in FIGS. 14 through 19, discussed below.

If some segment of the event text other than data portion 1315 was identified and color-coded as event data having a correspondence to a field value by application of an extraction rule then, in one implementation, GUI 1300 would enable the user to specify an anonymization method for the field extraction rule related to that other segment. In such an embodiment, the computing machine may automatically update GUI 1300 in response to the user having selected an anonymization method for the extraction rule related to segment 1315 by, for example, placing that other segment in field value box 1323, placing the fieldname of the corresponding extraction rule in fieldname box 1321, and clearing any selection from anonymization method drop-down 1331.

FIGS. 14 through 19 illustrate GUI displays for customizing particular anonymization methods. FIGS. 14 through 19 reflect an implementation where a portion of the display image remains stable while another portion is changed to reflect the customization options available for a selected replacement (anonymization) method.

Figure 14:
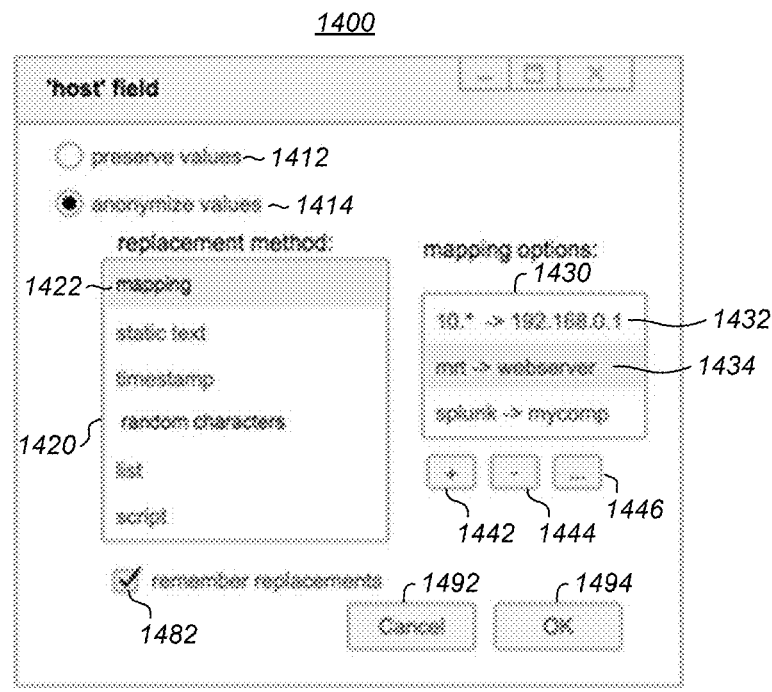
FIG. 14 illustrates a GUI display in accordance with disclosed embodiments for specifying certain anonymization options for a mapping replacement method.

FIG. 14 illustrates a GUI display in accordance with disclosed embodiments for specifying certain anonymization options for a mapping replacement (anonymization) method. The mapping replacement method operates by using the value of the data to be replaced to look up its replacement value. The value of the data to be replaced in the event data corresponds to the field value produced by the associated extraction rule. The implementation in one embodiment is more elaborate than a simple 1-to-1 lookup table, however, as the value of the data to be replaced can be specified using patterns to match (e.g., regex expressions, wildcards), rather than just literals.

The title bar of GUI 1400 displays the name of the field for which the mapping anonymization method has been chosen, here, the "host" field. The fieldname in an embodiment is an association to an extraction rule, or one or more extraction rules united by a common fieldname. Radio buttons 1412 and 1414 are operationally coupled to allow only one of the buttons to indicate a selected state at the same time. If the "preserve values" option button 1412 is selected, no anonymization is performed on the source event data that corresponds to the field value of the extraction rule—the original, clear event data is retained in the output dataset. The remaining customization options appearing in GUI 1400 have no effect when the preserve values radio button 1412 is selected. If the anonymize values radio button 1414 is in the selected state many of the remaining GUI elements of GUI 1400 enable a user to specify how the anonymization of those values occurs. List box 1420 displays a list of available anonymization methods. List box 1420 may be populated from a static list or by dynamically retrieving a list, such as a configurable list of supported anonymization methods. For GUI depiction 1400 the "mapping" option 1422 is shown to be selected. As a result of the selection of mapping option 1422 in list box 1420, mapping specification box 1430 and related function buttons 1442, 1444, and 1446 are caused to be displayed. Mapping specification box 1430 is shown to include three mapping entries. Each mapping entry specifies a literal or pattern to match in the source event data that corresponds to the value of an extraction rule for the named field. Each mapping entry further specifies a value for replacing the source event data in order to achieve anonymization. Entry 1432 of mapping specification box 1430, for example, specifies "10.1.1.1." as the mapping specification. Accordingly, if the host field extraction rule produces a field value of "10.1.1.1" in association with a first event record, the event data text "10.1.1.1" corresponding to the field value will be replaced during the anonymization process with "192.168.0.1" because "10.1.1.1" matches the wildcard pattern "10.*". Similarly, if the host field extraction rule produces a field value of "10.234.12.20" in association with a second event record, the event data text "10.234.12.20" corresponding to the field value will be replaced during the anonymization process with "192.168.0.1" because "10.234.12.20" matches the wildcard pattern "10.*". Add button 1442 enables a user to indicate through the GUI that the computing machine should provide a blank entry in the list of the mapping specification box 1432 enable the user to provide an additional mapping specification. Delete button 1444 enables a user to indicate through the GUI that the computing machine should delete one or more selected entries in the list of the mapping specification box 1432. The second entry shown for mapping specification box 1432 is entry 1434 having the value "mrt->webserver". A darker background color for entry 1434 indicates that it is selected. Accordingly, if the user were to activate delete button 1444 with GUI 1400 in the state illustrated in FIG. 14, the second entry of mapping specification box 1432, i.e., "mrt->webserver" would be deleted. In view of the situation where a user has a very long list of mapping specifications difficult to manage within the confines of mapping specification box 1430, "See more" button 1446 enables the user to navigate to a GUI portion accommodating the management of larger mapping specification lists. While such a GUI portion is not specifically illustrated, one skilled in the art now recognizes that the teachings regarding GUIs in this disclosure can instruct the implementation of such a GUI portion. The "remember replacements" check box 1482 of GUI 1400 enables the user to specify the anonymization option for the instant field that actual replacements made during anonymization should be recorded. Recording replacements is useful to enable cross-field consistency and for verification, quality testing and analysis. Cancel button 1492 enables a user to indicate through the GUI that the computing machine should abandon the user attempt to provide specifications to customize the mapping anonymization method for the host field. OK button 1494 enables the user to indicate through the GUI that the computing machine should utilize the specifications to customize the mapping anonymization method for the host field provided by the user using GUI 1400. A utilization of the specifications, in one embodiment, includes representing the information specifying the mapping replacement method in the information of the anonymization configuration being determined.

Figure 15:
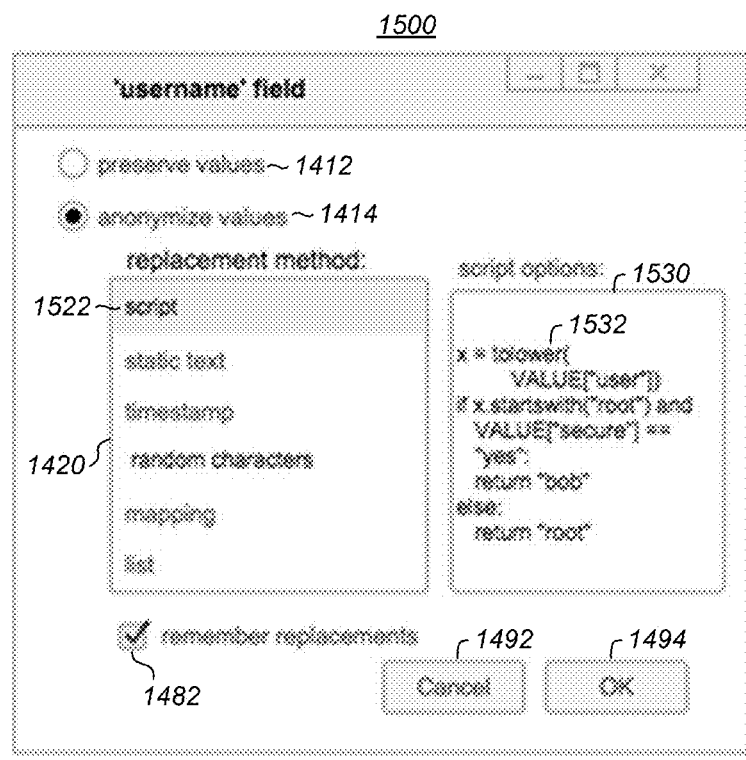
FIG. 15 illustrates a GUI display in accordance with disclosed embodiments for specifying certain anonymization options for a script replacement method.

FIG. 15 illustrates a GUI display in accordance with disclosed embodiments for specifying certain anonymization options for a script replacement method. The script replacement (anonymization) method operates by executing a user provided script to perform the anonymization for event data corresponding to the field value of an extraction rule. In one embodiment, when the user script is invoked it has access to the entire text of the event, all field values, the field implicated for the current anonymization, and other relevant arguments. In regards to GUI 1500, preserve values radio button 1412, anonymize values radio button 1414, list box 1420, remember replacements checkbox 1482, cancel button 1492, and OK button 1494 operate as described in relation to GUI 1400 of FIG. 14. List box 1420 of FIG. 15 shows the selected anonymization method to be script 1522. Because of the selection of the script entry 1522 in the anonymization method list box 1420, script options box 1530 is displayed for the GUI. The user is thereby enabled to enter a script, such as 1532, which specifies the process to use to anonymize the segment of event data corresponding to the field value of an extraction rule for the "username" field. For example, script 1532 includes the following code to return the desired anonymization for a username field:

```
x = tolower(VALUE["user"])
if x.startswith("root") and VALUE["secure"]=="yes":
    return "bob"
else:
    return "root"
```

In this example, if a user field starts with "root" and a secure field contains "yes", the anonymized value for the username returned by the script is "bob", otherwise the anonymized value for the username returned by the script is "root".

Figure 16:
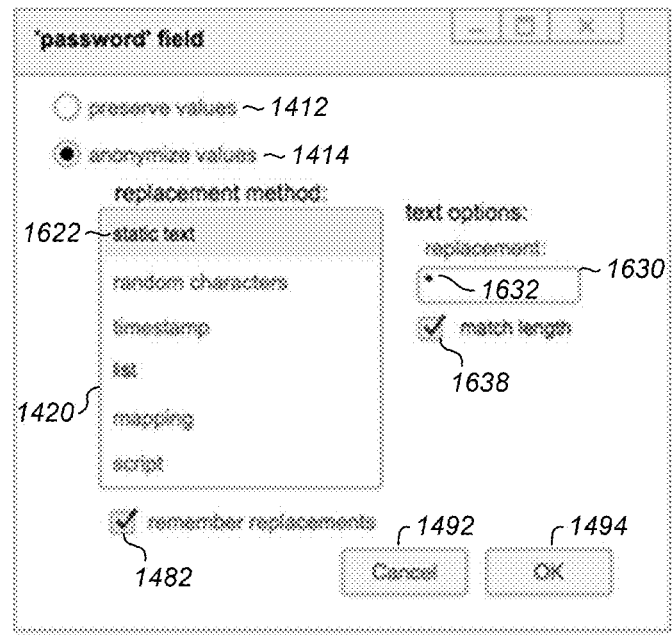
FIG. 16 illustrates a GUI display in accordance with disclosed embodiments for specifying certain anonymization options for a static replacement method.

FIG. 16 illustrates a GUI display in accordance with disclosed embodiments for specifying certain anonymization options for a static replacement method. The static replacement method operates by replacing the event data corresponding to a field value of an extraction rule for a field with a value derived from a constant, literal value. The value derived may be the constant itself, a truncated version of the constant value where the source value was shorter than the constant value and length matching is chosen, or an extended version of the constant value where the source value was longer than the constant value and length matching is chosen. In regards to GUI 1600, preserve values radio button 1412, anonymize values radio button 1414, list box 1420, remember replacements checkbox 1482, cancel button 1492, and OK button 1494 operate as described in relation to GUI 1400 of FIG. 14. List box 1420 of FIG. 16 shows the selected anonymization method to be static text 1622. Because of the selection of the static text entry 1622 in the anonymization method list box 1420, static text replacement box 1630 and match length checkbox 1638 are displayed for the GUI. The user is thereby enabled to enter the constant, literal text value from which all replacement values for the fields are derived. If user interaction with the GUI produces no selection indication for the match length checkbox 1638, the segment of event data corresponding to the field value of an extraction rule for the "password" field will be exactly the value specified by the user in box 1630—the one-character text constant 1632, a single asterisk ("*") in this illustration. If user interaction with the GUI produces a selection indication for the match length checkbox 1638, the segment of event data corresponding to the field value in extraction rule for the "password" field will be a character string having as many asterisks as the length of the original segment of event data, in this illustration.

Figure 17:
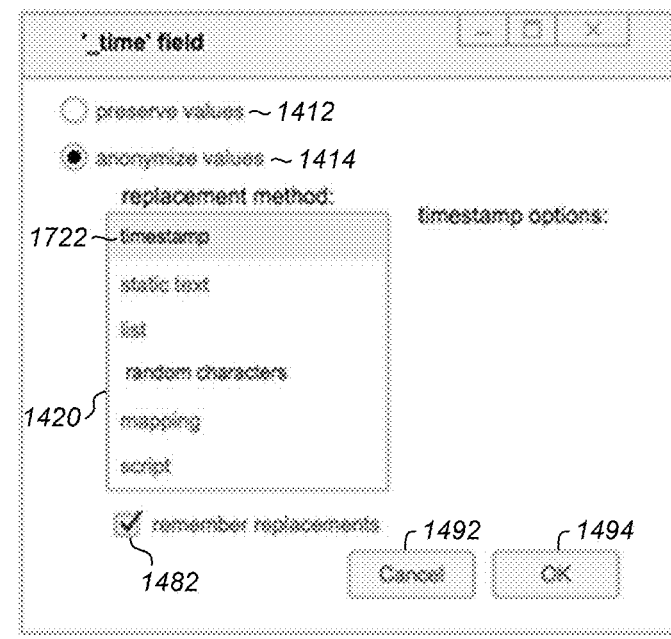
FIG. 17 illustrates a GUI display in accordance with disclosed embodiments for specifying certain anonymization options for a timestamp replacement method.

FIG. 17 illustrates a GUI display in accordance with disclosed embodiments for specifying certain anonymization options for a timestamp replacement method. The timestamp replacement method operates by replacing the event data corresponding to a field value of an extraction rule for a field (always a timestamp) with a recalculated timestamp. Recalculation of the timestamps is uniform across all events so there are no per-field options to specify. This is amply illustrated by the absence of any GUI elements for timestamp options when this timestamp replacement (anonymization) method 1722 is selected in list box 1420 of GUI 1700. Certain output settings relate to the recalculation of timestamps and are discussed in relation to FIG. 20.

Figure 18:
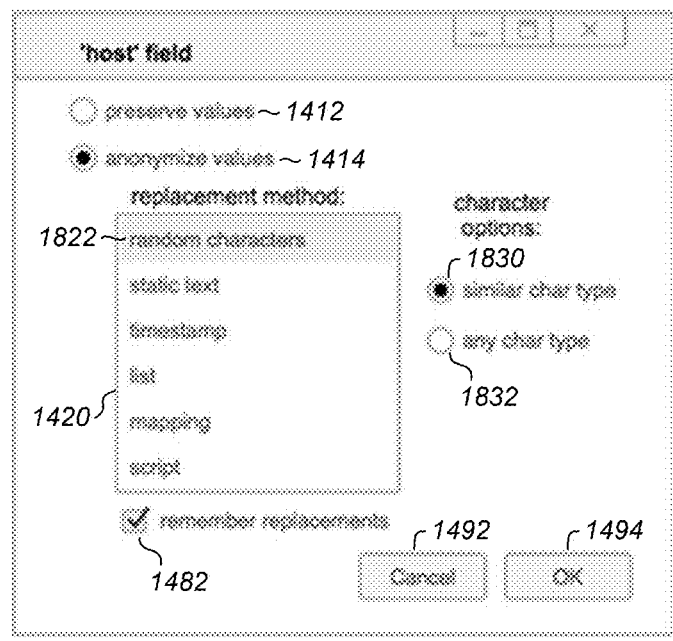
FIG. 18 illustrates a GUI display in accordance with disclosed embodiments for specifying certain anonymization options for a random character replacement method.

FIG. 18 illustrates a GUI display in accordance with disclosed embodiments for specifying certain anonymization options for a random character replacement method. The random character replacement method operates by substituting each character in the source data segment with a randomly selected character appropriate for its type. In one embodiment, an uppercase character is replaced by a randomly chosen upper case character. A lowercase character is replaced by a randomly chosen lowercase character. A numeric digit is replaced with a randomly chosen digit less than or equal to it. It is not necessarily important that the randomness of the selections approach a theoretical ideal for randomness. Randomness departing from a theoretical ideal can produce good results for purposes of anonymization. In some cases, departing from a textbook randomness distribution could provide more than adequate randomness to achieve the goal of preventing the leakage of sensitive information while at the same time serving another purpose, such as contributing to the ability to encode a watermark in the anonymized data.

In regards to GUI 1800, preserve values radio button 1412, anonymize values radio button 1414, list box 1420, remember replacements checkbox 1482, cancel button 1492, and OK button 1494 operate as described in relation to GUI 1400 of FIG. 14. List box 1420 of FIG. 16 shows the selected anonymization method to be random characters 1822. Because of the selection of the random characters entry 1822 in the anonymization method list box 1420, radio buttons 1830 and 1832 are presented by GUI 1800. Radio buttons 1830 and 1832 are operably coupled by the computing machine such that only one can indicate a selected state at a time. If a default setting or user interaction result in the selected state for similar character type radio button 1830, then each character in the source data segment corresponding to a field value of the search result for a "host" field, in this example, will be replaced with a random character of the same type as already described—uppercase for uppercase, lowercase for lowercase, digit less than or equal for a digit. In one embodiment, alphabetic characters may be separated into vowel and consonant types for substitution. If radio button 1832, instead, indicates the selected state, then each character in the source data segment will be replaced with a random character without regard to type. For example, a lowercase "a" in the source may be replaced by an "s", "J", "3" or any other character of any type. The pool of substitution characters in this case may be expanded beyond alphanumerics. For example symbols such as the dollar sign ("$"), the ampersand ("&"), or other symbol could be available substitutes for anonymization.

Figure 19:
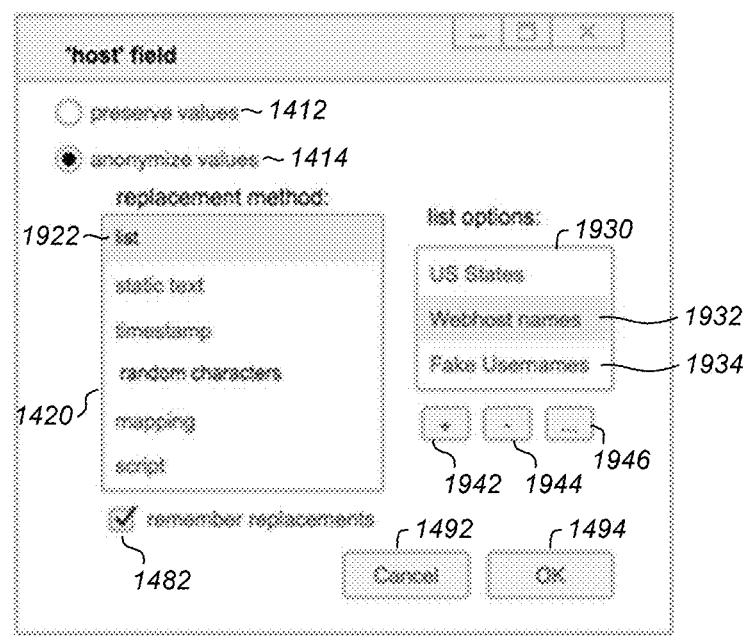
FIG. 19 illustrates a GUI display in accordance with disclosed embodiments for specifying certain anonymization options for a list replacement method.

FIG. 19 illustrates a GUI display in accordance with disclosed embodiments for specifying certain anonymization options for a list replacement method. The list replacement method operates by replacing the source text with a value chosen randomly from a predefined list of substitute values. For example, if the data segment in the source of that record corresponds to a field value of a an extraction rule for a state field as used in a mailing address, a substitution list for the list anonymization method could be a simple list of all valid postal state codes. In an embodiment where the value is chosen randomly from the predefined list, a non-random distribution can be achieved by repeating values in the list. For example, if the postal state code "CA" appeared 12 times in the substitution list, it should appear nearly 12 times as often in the anonymized output as a non-repeated state code. In another embodiment, entries in the predefined list can each have an associated weighting value. In such an embodiment a weighted distribution can be achieved apart from the use of duplicates.

In regards to GUI 1900, preserve values radio button 1412, anonymize values radio button 1414, list box 1420, remember replacements checkbox 1482, cancel button 1492, and OK button 1494 operate as described in relation to GUI 1400 of FIG. 14. List box 1420 of FIG. 19 shows the selected anonymization method to be list 1922. Because of the selection of the list entry 1922 in the anonymization method list box 1420, list data box 1930 and related function buttons 1942, 1944, and 1946 are caused to be displayed. The related function buttons 1942, 1944, 1946 operate in a parallel fashion to list data box 1930 as function buttons 1442, 1444, and 1446 of FIG. 14, respectively, operate in regard to list box 1430 of FIG. 14. In one embodiment, as illustrated in regards to FIG. 19, each entry in the list data box, such as entry "Webhost names" 1932, is the name of a saved list. The name may be the name of the file in the filesystem or the name of the table in a database, for example, where the list is stored. In one implementation, the name of the saved list appearing as an entry analyst data box 1930 is considered to be a filename with an assumed filename extension. For example, "Fake Usernames" entry 1934 may represent a file named "Fake Usernames.txt" or "Fake Usernames.lst" that contains a list of fictitious (or, at least, invalid or impossible) usernames to replace real username values appearing in event data during anonymization. Such a list may contain the names of cartoon characters, for example. In one embodiment, not illustrated, each entry in the list data box is a substitution value for the data associated with the field, so the list of list data box 1930 is the list providing the substitute values for the list anonymization method when anonymization is performed.

Figure 20:
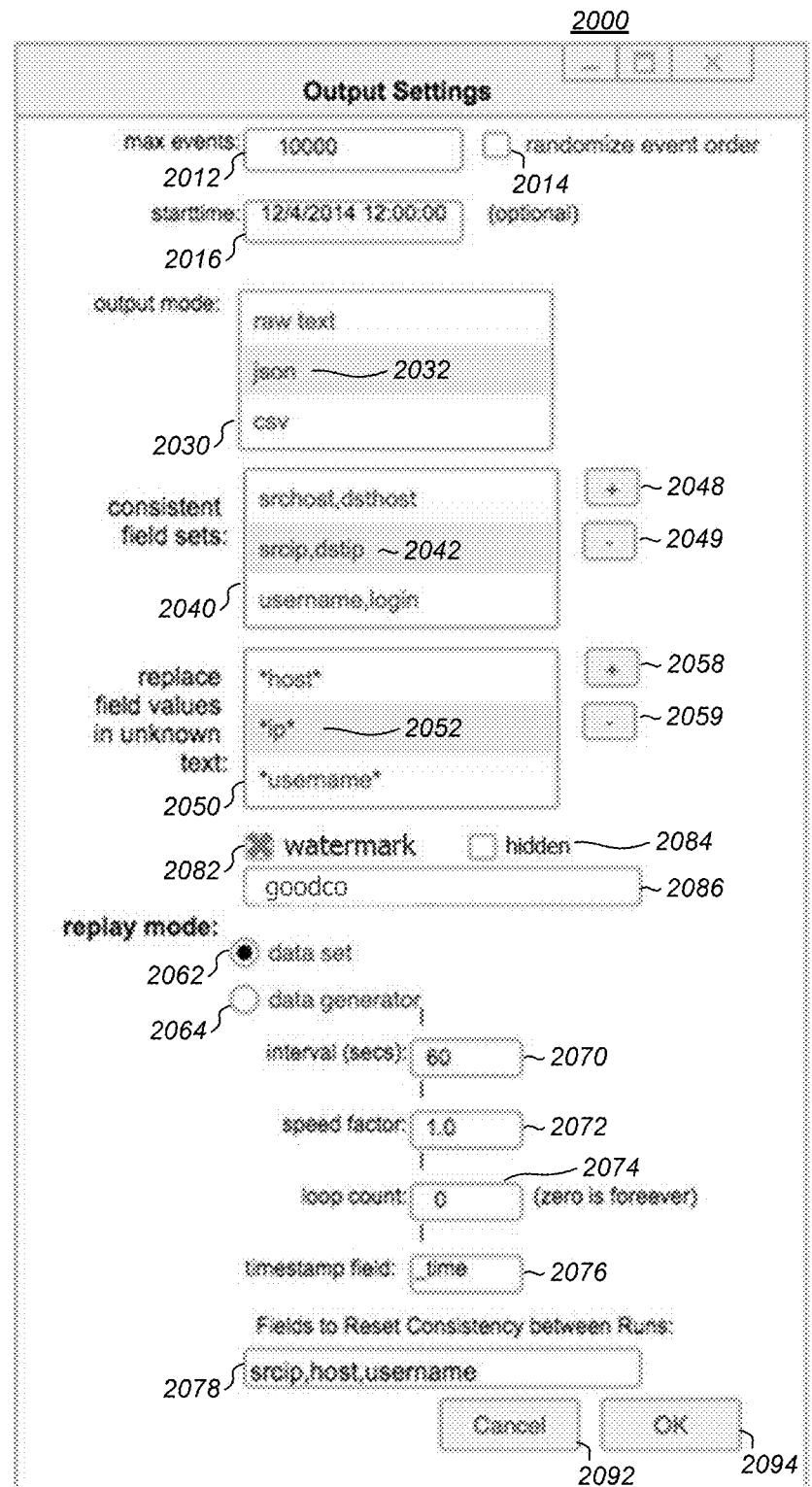
FIG. 20 illustrates a GUI display in accordance with disclosed embodiments for specifying certain anonymization output settings.

FIG. 20 illustrates a GUI display in accordance with disclosed embodiments for specifying certain anonymization output settings. One embodiment may present GUI display 2000 to the user while executing a method enabling a user, such as an IT technician, to specify anonymization configuration information. GUI 2000 includes GUI elements to display information related to, and enable user interaction to provide information for specifying, certain options to direct the generation of an output dataset for an anonymization process. Such options may be included among the information of an anonymization configuration. "Max events" box 2012 enables the user to specify the maximum number of events to be generated to the output data set of the anonymization process. "Max events" box 2012 displays a value of 10,000 which may appear there as a system provided default value or as the result of user interaction with box 2012 to specify the maximum value. "Randomize event order" checkbox 2014 enables the user to indicate whether events in the output data set should appear in their original order or in a randomized order. When the "randomize event order" checkbox 2014 does not indicate a selected condition, events in the output data set retain their original order. Moreover, the relative interval between the timestamps of any two events in the original source data will be maintained in the output data set. To achieve this, the anonymizer uses the start time provided in box 2016 or, if no start time is provided in box 2016 the anonymizer uses the then current time, and calculates the difference between its chosen time and the timestamp of the first (earliest) event record of the input data. The offset is then added to this timestamp of each event record of input data and the relative timing between events can be maintained. When the "randomize event order" checkbox 2014 does indicate a selected condition, events in the output data set you are assigned a random timestamp. To achieve this, the anonymizer may calculate the difference between the timestamps of the first (earliest) event record of the input data and the last (latest) event record of the input data. The anonymizer then determines the start time for a new time range. The anonymizer uses the start time provided in box 2016 or, if no start time is provided in box 2016 the anonymizer uses the then current time. The anonymizer then determines the end time for the new time range by adding the difference calculated between the first and last timestamps of the input data. Then each event in the output data set is given a timestamp randomly assigned from within the new time range.

Output mode selection box 2030 enables the user to indicate a selection of data formatting to use for the output data set. The list of the output mode selection box 2030 may be populated from a static list or by dynamically retrieving a list, such as a configurable list of supported output dataset formats. Output mode selection box 2030 shows "raw text", "json", and "csv" as available options, and indicating "json" 2032 as the selected option. "Raw text" may be used for anonymized data that will be loaded into an event processing system for testing and simulation purposes. "JSON" or "json" (indicating Java Script Object Notation format) may be used for compatibility with the computing environment and its flexible data representation. "CSV" or "csv" (indicating Comma Separated Values format) may be used for its wide acceptance and compatibility with analysis tools expecting tabular data.

In one embodiment, a record is maintained of the substitutions made during the anonymization process for event data corresponding to a particular field so consistent substitutions can be made in the context of the field. (It can often be the case that consistently anonymized data is better at representing real-world event data, and so is more useful for testing or simulation, than simply randomized data is.) For example, the first time during an anonymization run that the value "anycompany.com" is substituted for "mycompany.com" in event data corresponding to a domainName field, that substitution is recorded so that every subsequent time during the anonymization run that "mycompany.com" is encountered in event data corresponding to a domainName field, it can be substituted with "anycompany.com" consistently. Sometimes the value and usefulness of the anonymized data can be further magnified if consistent substitutions can be made not just to data in the context of one field, but across the contexts of multiple fields. For example, the anonymized data produced by an anonymization run may be more useful if "anycompany.com" is consistently substituted for "mycompany.com", not just in the event data corresponding to a domainName field, but also in event data corresponding to a related webDomain field. Consistent field sets box 2040 enables the user to specify fields for which corresponding event data should be substituted on a consistent basis across the fields. For example, an IP address of 1.1.1.1 may first appear in an event in association with a "srcip" (i.e., source IP address) field, and be anonymized to the value 9.9.9.9. The anonymized data may be more realistic and useful if the IP address of 1.1.1.1 is always anonymized to the value 9.9.9.9, regardless of whether it appears in association to the "srcip" field or the "dstip" (i.e., destination IP address) field. The user is enabled by consistent field set box 2040 to specify srcip and dstip as a consistent field set and to thereby indicate to an anonymizer using the anonymization configuration being determined to perform the kind of consistent substitution just described. Related function buttons 2048 and 2049 enables the user to provide an input requesting an addition to, or a deletion from, respectively, the entries of consistent field sets box 2040. In one embodiment, each entry of consistent field set box 2040 is a pair of field names, each related to one or more extraction rules producing field values that have a correspondence to raw data segments of event data.

Replace field values box 2050 enables the user to specify anonymization for fieldname-value-like data appearing in the unknown text of a source event. (Note that this functionality complements the ability to select anonymization for unspecified field data as discussed in relation to checkbox 1122 of FIG. 11, which addresses known, rather than unknown, text of a source event not having any specified anonymization.) A user may for example include fieldname "ip" in the list of box 2050 such as appears at entry 2052. If during anonymization text resembling a fieldname-value pair (i.e., fieldname-value-like data), e.g., "&ip:=3.3.3.3$$", though not defined as such by an extraction rule, is discovered in the unknown text of the source event, the anonymizer will anonymize the suspect value-like portion (in one embodiment, using random character substitution), producing something after the fashion of "&ip:=A.c.9.T$$", because the field name-like portion matched entry 2052 in replace field values box 2050. Related function buttons 2058 and 2059 enable the user to provide an input requesting an addition to, or a deletion from, respectively, the entries of replace field values box 2050.

Watermark checkbox 2082, hidden checkbox 2084, and watermark text box 2086 enable a user to specify information for an anonymization configuration related to the watermarking of an output data set. A user may interact with watermark checkbox 2082 to indicate whether the anonymization configuration under development should specify that watermarking be performed. Watermark text box 2086 enables a user to specify information for the watermarking process if watermarking is selected using checkbox 2082. The information of watermark text box 2086, such as the value "goodco" shown in FIG. 20, may be used directly in the watermarking process. For example, the value from watermark text box 2086 may be inserted into, appended to, or replace, event data during an anonymization process, or it may be included in the data of anonymization "events" created and inserted into the output data set in one possible method of watermarking. In another embodiment, the information of watermark text box 2086 may be used as an input to the watermarking process but may never directly appear in the output data set. For example, the value "goodco" could be coded or encrypted, or used as a seed value for a random number generator used in the watermarking process. Hidden checkbox 2084 enables a user to indicate whether information in the anonymization configuration under development should specify that the watermarking of the output data set should be hidden, i.e., not readily observable by viewing the data. Steganographic methods may be employed to produce hidden watermarking in noise-tolerant portions of the output data, e.g., randomized text field data, in one embodiment. In one embodiment, the repeated placement of seemingly random character sequences at a statistically unlikely frequency may be employed to produce hidden watermarking. These and other methods are possible.

An anonymizer implementation may have the capability of supporting an output mode where source event data is received, anonymized once, then stored, and another output mode where source event data is received and anonymized over iterations and possibly delivered as input to another application or system as the anonymization occurs. These output modes may be referred to as data set mode and replay mode (or data generator mode), respectively. Radio buttons 2062 and 2064 enable the user to select an output mode for an anonymization configuration. Radio buttons 2062 and 2064 are operably coupled by the computing machine to prevent more than one of them from being simultaneously in a selected state. When radio button 2062 is selected, either as the result of a default value or as the result of user interaction with GUI 2000, the data set mode is chosen as the output mode for an anonymization using the anonymization configuration under development to direct its operation. In data set mode, the anonymizer produces an output data set that is a version of the source event data transformed to an anonymized form in accordance with the anonymization configuration. The output data set is stored to a file or other, generally persistent, storage device. When radio button 2064 is selected, the replay mode is chosen as the output mode for an anonymization using the anonymization configuration. In replay mode, once all of the anonymized events are output, the process of anonymization repeats. The original events are anonymized again with newly replaced random values and updated timestamps, and appended to the output of the prior iteration. Replay mode can effectively create a "live" or active stream of simulated data from a fixed number of original events. In one embodiment, replay mode not only updates the timestamps of the anonymized event data but models the timing of the anonymized event generation. In this mode of operation is particularly useful to be able to direct the output data set not just to persistent storage but to a real-time connection with another computing application via a network-based connection or the like. In one embodiment, replay mode can effectively create a "live" or active stream or dataset of anonymized data from very recent, or real-time or near real-time events. When replay mode is selected a number of additional parameters are available to the user to direct the generation of output in replay mode.

Interval box 2070 permits a user to specify how long the anonymizer should process source event data to generate replay output before looping back to the beginning of the event data for another iteration. In one embodiment, the value for interval box 2070 may be set to zero to indicate a continuous stream mode. In one implementation of an anonymizer, an indicator of continuous stream mode in an anonymization configuration causes the anonymizer to ignore any selection criteria (e.g., time interval) or filter criteria (e.g., a maximum count) applied to the data source that effectively impose a maximum timestamp value for the event data that will be received and, rather than looping back to re-anonymize the same source event data, progressively later source event data will be anonymized. In one similar implementation of an anonymizer, an indicator of continuous stream mode in an anonymization configuration causes the anonymizer to also ignore anonymization configuration information effectively specifying a beginning (earliest) timestamp value for the event data to be received and, rather using the most recent and, perhaps, real-time or near real-time event data as the source of data for the anonymization.

Speed factor box 2072 permits a user to specify the multiple of the rate of event production seen in the source event data to be used to control the rate of event generation during replay mode. A speed factor of 1 indicates that the replay generator should produce anonymized event data at the same rate event data is represented in the source. A speed factor of 2 indicates that the replay generator should produce anonymized event data at twice the rate event data is represented in the source. Loop count box 2074 permits a user to specify how many iterations of anonymization should be performed by the replay generator. After the specified number of iterations the anonymization run will conclude. A loop count of zero appearing and loop count box 2074 indicates that the replay generator should continue to iterate indefinitely. Timestamp field box 2076 enables a user to specify the primary timestamp field that an extraction rule can produce from the source event data. Data associated with the timestamp field name can timestamp field box 2076 supplies the replay generator with the chronological information it needs to generate anonymized event data according to any timing specifications included in the anonymization configuration information. Consistency reset fields box 2078 enables a user to specify fields (whose values have a correspondence to certain event data) that should get a newly anonymized value at the start of each iteration. By default in one embodiment once a particular value for a field is anonymized it will continue to be anonymized to the same value from that point forward, across iterations. This is field consistency. In certain circumstances, such as to test using a greater data variety, it may be desirable for a user to generate anonymized data that is consistent for the field within each iteration but not beyond the boundaries of an iteration. Specifying a field name in consistency reset fields box 2078 will instruct a replay generator using the anonymization configuration under development to reset the consistency for the named field at the beginning of each iteration. The anonymization options indicated by the foregoing GUI elements of GUI 2000 at the time the OK button 2094 is activated by the user, whether default settings or explicit user specifications, are stored as information for an output options component of an anonymization configuration.

2.4 Anonymization Process and Display

FIG. 21 presents a flowchart illustrating an anonymization process. The illustrated anonymization process of FIG. 21 anonymizes event data 2184 in accordance with a stored configuration 2182 producing an output data set or data repository of anonymized data 2186. In one embodiment, the anonymization process represented in FIG. 21 is directed to production-time use of a developed anonymization configuration to produce the desired output data set of anonymized events. In another embodiment, the anonymization process represented in FIG. 21 is directed to the development-time use of a developing anonymization configuration to produce a sample output data set of anonymized events for feedback in the development process. Accordingly, one of skill in the art will recognize that the processing represented by the method depicted in FIG. 21 has a readily understood relationship with the processing represented by the method depicted in FIG. 9, and that some of the processing represented by FIG. 21 may be subsumed in the processing represented in FIG. 9 (e.g., block 918), or that appending the processing of FIG. 21 to the processing represented by FIG. 9 could be useful in a development cycle. The method may be performed by processing logic that may comprise hardware (circuitry, dedicated logic, etc.), software (such as is run on a general purpose computer system or a dedicated machine), or a combination of both. In one implementation, the method is performed by the client computing machine. In another implementation, the method is performed by a server computing machine coupled to the client computing machine over one or more networks.

At block 2101, the method begins. At block 2112 a configuration is determined. The configuration is an anonymization configuration such as one created by the method discussed in relation to FIG. 9. Determining the configuration involves identifying it adequately so as to be able to access its contents. Determining the configuration may also include accessing its contents, e.g., reading the stored data set, in preparation to perform an anonymization operation in accord with the anonymization configuration. The anonymization configuration has the information required to direct an anonymization run. The anonymization configuration has information related to the input (e.g., event data source identification), processing (e.g. anonymization method selections and customizations), and output (e.g., output mode and format) of an anonymization.

At block 2114, event data is received from event data source 2184. Information from the anonymization configuration determined at block 2112 may be used to locate and access the event data source 2184. In one embodiment, the event data source is an event processing system and event data can be accessed using search queries. The search queries of the event processing system have the capability to both retrieve the event data satisfying one or more search, filter, or selection criteria and to perform virtually unlimited data processing operations using the retrieved data to produce a search query result. At block 2116 event data received at block 2114 is systematically transformed to an anonymized form. In one embodiment, a search query of the event processing system is used to perform the transformation. Data source information of the anonymization configuration is included in the search query. Anonymization method and customization information of the anonymization configuration is included in the search query such that anonymized event data are included in the search query result. As event data is anonymized it can be added to the anonymized data store 2186. At block 2118, a determination is made whether the source of event data has been exhausted. If unprocessed source event data exists processing returns to block 2114 where it can be received. If the source event data has been exhausted processing proceeds to block 2120. At block 2120, a determination is made whether to repeat the anonymization process. If the anonymization configuration indicates the selection of the data set output mode, processing proceeds to block 2122. If the anonymization configuration indicates the selection of the replay output mode, processing proceeds to block 2122 only if a sufficient number of iterations have been made over the data based on information in the anonymization configuration. If another iteration is required, processing proceeds to block 2112 to determine the configuration for the subsequent iteration. For example, consistency for certain fields may need to be reset for the new iteration based on information in the anonymization configuration. When processing does proceed to block 2122, the output data set, regardless of its storage or connection type, is closed. Processing proceeds to block 2124 where anonymized data is displayed. The processing represented by block 2124 may be omitted altogether in many production scenarios. The processing represented by block 2124 may be particularly valuable when the processing of FIG. 21 is conducted as part of the process of developing useful anonymization configurations. In such a scenario, the displaying of output at block 2124 may include displaying original source event data along with the corresponding anonymized form of the event data for comparison.

The invention claimed is:

1. A method comprising:
causing a graphical user interface (GUI) to display information related to one or more events and to enable the user to specify anonymization configuration information including information indicating that an output dataset is a stored dataset or an active dataset, each of the one or more events comprising a timestamp and a portion of machine data, and wherein the displayed information of the one or more events, for each event, includes at least some of the portion of machine data of the respective event including latent field data; and
causing the GUI to display information related to at least one of the one or more events in anonymized form, wherein the anonymized form is determined at least in part by user input received from the GUI for specifying anonymization configuration information.

2. The method of claim 1 further comprising transforming at least some of the information related to one or more events into the anonymized form using an extraction rule.

3. The method of claim 1 wherein the anonymized form is determined at least in part by replacing a source value for a field in the information related to at least one of the one or more events, the source value for the field located using an extraction rule.

4. The method of claim 1 further comprising receiving event data from a search query of an event processing system, and wherein the received event data is a source of the information related to one or more events.

5. The method of claim 1 further comprising receiving event data from a search query, the received event data matching a selection criteria for event data of an event processing system, the selection criteria being based at least in part on user input received via the GUI, and wherein the received event data is a source of the information related to one or more events.

6. The method of claim 1 further comprising storing an anonymization configuration in an anonymization configuration data store, the anonymization configuration based at least in part on user input received from the GUI for specifying anonymization configuration information.

7. The method of claim 1 wherein the causing the GUI to display information related to one or more events includes causing the GUI to display a list of events.

8. The method of claim 1 wherein the causing the GUI to display information related to one or more events includes causing the GUI to display, for a particular event, information including rule-identified data and other non-rule-identified data, and wherein the visual appearance of the rule-identified data is different than the visual appearance of the non-rule-identified data.

9. The method of claim 1 wherein causing the GUI to display information related to one or more events includes causing the GUI to display machine data associated with the particular event, wherein the displayed machine data associated with the particular event includes a segment of rule-identified data, and wherein the user is enabled to interact distinctly with the displayed segment of rule-identified data.

10. The method of claim 1 wherein causing the GUI to enable the user to specify anonymization configuration information includes causing the GUI to enable the user to specify an anonymization type for association with an extraction rule in an anonymization configuration.

11. The method of claim 1 wherein causing the GUI to enable the user to specify anonymization configuration information includes causing the GUI to enable the user to identify an extraction rule by interacting with displayed machine data identified using the extraction rule, and causing the GUI to enable the user to specify an anonymization type for association with the extraction rule in an anonymization configuration.

12. The method of claim 1 wherein causing the GUI to enable the user to specify anonymization configuration information includes causing the GUI to enable the user to identify an extraction rule by interacting with displayed machine data identified using the extraction rule, and causing the GUI to enable the user to specify script, static, timestamp, list, or map as an anonymization type for association with the extraction rule in an anonymization configuration.

13. The method of claim 1 wherein causing the GUI to enable the user to specify anonymization configuration information includes causing the GUI to enable the user to identify an extraction rule by interacting with displayed machine data identified using the extraction rule, and causing the GUI to enable the user to specify an anonymization type for association with the extraction rule in an anonymization configuration, and wherein the anonymization type is specified by choosing one from among at least random, script, static, timestamp, list, and map.

14. The method of claim 1 wherein causing the GUI to enable the user to specify anonymization configuration information includes causing the GUI to enable the user to identify an extraction rule by interacting with displayed machine data identified using the extraction rule, and causing the GUI to enable the user to specify, for association with the extraction rule in an anonymization configuration:
   an anonymization type, and
   information for directing the performance of anonymization in accordance with the anonymization type.

15. The method of claim 1 wherein causing the GUI to enable the user to specify anonymization configuration information includes causing the GUI to enable the user to specify a list-type anonymization type and an associated anonymization list having a plurality of values.

16. The method of claim 1 wherein causing the GUI to enable the user to specify anonymization configuration information includes causing the GUI to enable the user to specify a script-type anonymization type and an associated anonymization script having computer language script for determining an anonymized value.

17. The method of claim 1 wherein causing the GUI to enable the user to specify anonymization configuration information includes causing the GUI to enable the user to specify a map-type anonymization type and associated anonymization map information including at least one value and a corresponding anonymized value.

18. The method of claim 1 wherein causing the GUI to enable the user to specify anonymization configuration information includes causing the GUI to enable the user to specify a timestamp-type anonymization type and an associated time value for determining a time offset.

19. The method of claim 1 wherein causing the GUI to enable the user to specify anonymization configuration information includes causing the GUI to enable the user to specify a random-type anonymization type and information for determining a set of values available for random substitution.

20. The method of claim 1 wherein causing the GUI to enable the user to specify anonymization configuration information includes causing the GUI to enable the user to specify a list of one or more terms for exclusion from change by an anonymization.

21. The method of claim 1 wherein causing the GUI to enable the user to specify anonymization configuration information includes causing the GUI to enable the user to specify information about an output dataset.

22. The method of claim 1 wherein causing the GUI to enable the user to specify anonymization configuration information includes causing the GUI to enable the user to specify that the output dataset is an active dataset produced by one or more iterations over a set of event data.

23. The method of claim 1 wherein causing the GUI to enable the user to specify anonymization configuration information includes causing the GUI to enable the user to specify that the output dataset is stored where searchable using a late-binding schema.

24. The method of claim 1 wherein causing the GUI to enable the user to specify anonymization configuration information includes causing the GUI to enable the user to specify a consistency association between a first fieldname and a second fieldname such that an anonymization process using the consistency association, after having determined an anonymized field value to replace a particular source field value when associated with the first fieldname, uses the same anonymized field value to replace the particular source field value when associated with the second fieldname.

25. The method of claim 1 wherein the information related to at least one of the one or more events in anonymized form includes, for a particular event, an anonymized portion having data representing original data of the particular event transformed to an anonymized representation, and an un-anonymized portion having data representing unchanged original data of the particular event, and wherein the un-anonymized portion includes data representing all unchanged original data of the particular event identified by any extraction rule associated with the particular event, based on a user indication received via the GUI to preserve all field information.

26. The method of claim 1 wherein the information related to at least one of the one or more events in anonymized form includes, for a particular event, an anonymized portion having data representing original data of the particular event transformed to an anonymized representation, and an un-anonymized portion having data representing unchanged original data of the particular event, and wherein the un-anonymized portion includes data representing unchanged original data of the particular event identified by a selection of less than all extraction rules associated with the particular event, based on a user indication received via the GUI to preserve selected field information.

27. The method of claim 1 wherein causing the GUI to enable the user to specify anonymization configuration information includes causing the GUI to enable the user to indicate a watermarking specification.

28. A system comprising:
a memory; and
a processing device coupled with the memory to:
cause a graphical user interface (GUI) to display information related to one or more events and to enable the user to specify anonymization configuration information including information indicating that an output dataset is a stored dataset or an active dataset, each of the one or more events comprising a timestamp and a portion of machine data, and wherein the displayed information of the one or more events, for each event, includes at least some of the portion of machine data of the respective event including latent field data; and
cause the GUI to display information related to at least one of the one or more events in anonymized form, wherein the anonymized form is determined at least in part by user input received from the GUI for specifying anonymization configuration information.

29. The system of claim 28 wherein causing the GUI to display information related to one or more events includes causing the GUI to display, for a particular event, information including rule-identified data and other non-rule-identified data, and wherein the visual appearance of the rule-identified data is different than the visual appearance of the non-rule-identified data.

30. A non-transitory computer readable storage medium encoding instructions thereon that, in response to execution by one or more processing devices, cause the one or more processing devices to perform operations comprising:
causing a graphical user interface (GUI) to display information related to one or more events and to enable the user to specify anonymization configuration information including information indicating that an output dataset is a stored dataset or an active dataset, each of the one or more events comprising a timestamp and a portion of machine data, and wherein the displayed information of the one or more events, for each event, includes at least some of the portion of machine data of the respective event including latent field data; and
causing the GUI to display information related to at least one of the one or more events in anonymized form, wherein the anonymized form is determined at least in part by user input received from the GUI for specifying anonymization configuration information.

* * * * *